United States Patent
Raman et al.

(10) Patent No.: US 11,030,185 B2
(45) Date of Patent: Jun. 8, 2021

(54) SCHEMA-AGNOSTIC INDEXING OF DISTRIBUTED DATABASES

(71) Applicant: Microsoft Technology Licensing, LLC, Redmond, WA (US)

(72) Inventors: Karthik Raman, Sammamish, WA (US); Momin Mahmoud Al-Ghosien, Sammamish, WA (US); Samer Boshra, Woodinville, WA (US); Brandon Chong, Kirkland, WA (US); Madhan Gajendran, Bengaluru (IN); Mikhail Mikhailovich Koltachev, Redmond, WA (US); Aravind Ramachandran Krishna, Kirkland, WA (US); Emily Lawton, Seattle, WA (US); Liang Li, Sammamish, WA (US); Karan Vishwanath Popali, Bellevue, WA (US); Adrian Ilcu Predescu, Sammamish, WA (US); Ankur Savailal Shah, Redmond, WA (US); Pankaj Sharma, Kirkland, WA (US); Dharma Shukla, Bellevue, WA (US); Hari Sudan Sundar, Redmond, WA (US); Krishnan Sundaram, Bellevue, WA (US); Shireesh Kumar Thota, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 15/991,786

(22) Filed: May 29, 2018

(65) Prior Publication Data
US 2019/0340273 A1 Nov. 7, 2019

Related U.S. Application Data

(60) Provisional application No. 62/668,226, filed on May 7, 2018.

(51) Int. Cl.
*G06F 16/22* (2019.01)
*G06F 16/23* (2019.01)
(Continued)

(52) U.S. Cl.
CPC ........ *G06F 16/2365* (2019.01); *G06F 9/5077* (2013.01); *G06F 11/2007* (2013.01);
(Continued)

(58) Field of Classification Search
CPC ........ G06F 16/13; G06F 16/41; G06F 16/178; G06F 16/2272; G06F 16/2365
See application file for complete search history.

(56) References Cited

U.S. PATENT DOCUMENTS

| 5,446,880 A | 8/1995 | Balgeman et al. |
| 5,581,753 A | 12/1996 | Terry et al. |

(Continued)

FOREIGN PATENT DOCUMENTS

| CN | 102497410 A | 6/2012 |
| CN | 104935672 A | 9/2015 |

(Continued)

OTHER PUBLICATIONS

Lim et al., "Automated Control for Elastic Storage", 2010, ACM. (Year: 2010).*

(Continued)

*Primary Examiner* — Sheryl L Holland
(74) *Attorney, Agent, or Firm* — Alleman Hall Creasman & Tuttle LLP

(57) ABSTRACT

Data sets such as databases are often distributed over a number of servers, where each server stores a subset of records and an index that enables the server to locate the records in response to queries. However, tight coupling of indexing and storage may limit load-balancing, fault recovery, and distribution. Instead, the set of servers may be
(Continued)

partitioned into a set of storage servers that store the records and a set of index servers of the index over the records. In a set that is decoupled in this manner, load-balancing may involve provisioning and locating index servers independently of the provisioning and locating of the storage servers in view of the particular sensitivities and tolerances of various applications. Additionally, the index servers may also utilize a data layout that is selected and adapted independent of the data layout of the storage servers and/or the schema of the data stored thereby.

18 Claims, 12 Drawing Sheets

(51) Int. Cl.
| | | |
|---|---|---|
| *G06F 16/27* | (2019.01) | |
| *G06F 11/20* | (2006.01) | |
| *G06F 16/2452* | (2019.01) | |
| *G06F 16/28* | (2019.01) | |
| *G06F 16/25* | (2019.01) | |
| *G06F 16/21* | (2019.01) | |
| *H04L 29/08* | (2006.01) | |
| *G06F 9/50* | (2006.01) | |
| *H04L 12/24* | (2006.01) | |
| *H04L 12/911* | (2013.01) | |
| *H04L 12/923* | (2013.01) | |
| *G06F 16/182* | (2019.01) | |
| *G06F 16/903* | (2019.01) | |
| *H04L 29/06* | (2006.01) | |

(52) U.S. Cl.
CPC ...... *G06F 11/2023* (2013.01); *G06F 11/2056* (2013.01); *G06F 16/184* (2019.01); *G06F 16/211* (2019.01); *G06F 16/219* (2019.01); *G06F 16/2246* (2019.01); *G06F 16/2255* (2019.01); *G06F 16/2272* (2019.01); *G06F 16/2315* (2019.01); *G06F 16/2322* (2019.01); *G06F 16/2329* (2019.01); *G06F 16/2336* (2019.01); *G06F 16/2452* (2019.01); *G06F 16/252* (2019.01); *G06F 16/258* (2019.01); *G06F 16/27* (2019.01); *G06F 16/28* (2019.01); *G06F 16/903* (2019.01); *H04L 41/0803* (2013.01); *H04L 41/0896* (2013.01); *H04L 41/5009* (2013.01); *H04L 41/5019* (2013.01); *H04L 41/5022* (2013.01); *H04L 41/5032* (2013.01); *H04L 47/72* (2013.01); *H04L 47/762* (2013.01); *H04L 67/1008* (2013.01); *H04L 67/1012* (2013.01); *H04L 67/1034* (2013.01); *H04L 69/24* (2013.01); *G06F 2201/80* (2013.01); *H04L 67/1029* (2013.01)

(56) References Cited

U.S. PATENT DOCUMENTS

| | | |
|---|---|---|
| 5,581,754 A | 12/1996 | Terry et al. |
| 5,787,262 A | 7/1998 | Shakib et al. |
| 5,923,850 A * | 7/1999 | Barroux ............ H04L 41/0213 709/223 |
| 6,523,032 B1 | 2/2003 | Sunkara et al. |
| 6,535,874 B2 | 3/2003 | Purcell |
| 6,925,457 B2 | 8/2005 | Britton et al. |
| 7,117,221 B2 | 10/2006 | Hahn et al. |
| 7,269,648 B1 | 9/2007 | Krishnan et al. |
| 7,509,354 B2 | 3/2009 | McGarvey |
| 7,606,838 B2 | 10/2009 | Tobies |
| 7,689,599 B1 | 3/2010 | Shah et al. |
| 7,751,331 B1 | 7/2010 | Blair et al. |
| 7,774,473 B2 | 8/2010 | Elving et al. |
| 7,877,644 B2 | 1/2011 | Stenzel |
| 8,311,981 B2 | 11/2012 | Braginsky et al. |
| 8,326,807 B2 | 12/2012 | Aiyer et al. |
| 8,386,421 B2 | 2/2013 | Reid et al. |
| 8,392,482 B1 * | 3/2013 | McAlister ........... G06F 16/1727 707/899 |
| 8,572,022 B2 | 10/2013 | Hagan et al. |
| 8,595,267 B2 | 11/2013 | Sivasubramanian et al. |
| 8,694,639 B1 | 4/2014 | Vermeulen et al. |
| 8,719,313 B2 | 5/2014 | Swett et al. |
| 8,745,127 B2 | 6/2014 | Gopal et al. |
| 8,824,286 B2 | 9/2014 | Lee et al. |
| 8,862,588 B1 | 10/2014 | Gay et al. |
| 8,880,508 B2 | 11/2014 | Jeong et al. |
| 8,943,180 B1 | 1/2015 | Petit-Huguenin |
| 8,972,491 B2 | 3/2015 | Abu-Libdeh et al. |
| 9,026,493 B1 | 5/2015 | Weng |
| 9,195,725 B2 | 11/2015 | Brown et al. |
| 9,219,686 B2 | 12/2015 | Hilt et al. |
| 9,225,770 B2 | 12/2015 | Wang et al. |
| 9,230,040 B2 | 1/2016 | Shukla et al. |
| 9,244,926 B2 | 1/2016 | Kakivaya et al. |
| 9,292,566 B2 | 3/2016 | Golab et al. |
| 9,356,793 B1 | 5/2016 | Drobychev et al. |
| 9,405,474 B2 | 8/2016 | Shukla et al. |
| 9,411,873 B2 | 8/2016 | Rath et al. |
| 9,460,129 B2 | 10/2016 | Mann |
| 9,462,427 B2 | 10/2016 | Patel et al. |
| 9,471,711 B2 | 10/2016 | Abadi et al. |
| 9,569,513 B1 | 2/2017 | Vig et al. |
| 9,619,261 B2 | 4/2017 | Gaurav et al. |
| 9,632,828 B1 | 4/2017 | Mehta et al. |
| 9,645,835 B2 | 5/2017 | Phillips et al. |
| 9,781,124 B2 | 10/2017 | Goldberg et al. |
| 9,888,067 B1 | 2/2018 | Yemini et al. |
| 10,552,443 B1 | 2/2020 | Wu et al. |
| 2002/0035642 A1 | 3/2002 | Clarke et al. |
| 2002/0161757 A1 | 10/2002 | Mock et al. |
| 2003/0037283 A1 | 2/2003 | Srinivasan et al. |
| 2003/0046396 A1 | 3/2003 | Richter et al. |
| 2003/0135643 A1 | 6/2003 | Chiu et al. |
| 2003/0220966 A1 | 11/2003 | Hepper et al. |
| 2004/0230571 A1 | 11/2004 | Robertson |
| 2004/0236801 A1 | 11/2004 | Borden et al. |
| 2005/0138170 A1 | 6/2005 | Cherkasova et al. |
| 2005/0160133 A1 | 7/2005 | Greenlee et al. |
| 2006/0106879 A1 | 5/2006 | Zondervan et al. |
| 2006/0155945 A1 | 7/2006 | Mcgarvey |
| 2006/0224773 A1 | 10/2006 | Degenaro et al. |
| 2006/0282836 A1 | 12/2006 | Barker |
| 2007/0073675 A1 | 3/2007 | Kaar et al. |
| 2008/0147627 A1 | 6/2008 | Natkovich et al. |
| 2008/0301025 A1 | 12/2008 | Boss et al. |
| 2009/0248737 A1 | 10/2009 | Shukla et al. |
| 2010/0082630 A1 | 4/2010 | Zagelow et al. |
| 2010/0094838 A1 | 4/2010 | Kozak |
| 2011/0149743 A1 | 6/2011 | Agarwal et al. |
| 2011/0258483 A1 | 10/2011 | Elson et al. |
| 2012/0136839 A1 | 5/2012 | Eberlein et al. |
| 2012/0185444 A1 | 7/2012 | Sparkes et al. |
| 2013/0064110 A1 | 3/2013 | Polinati et al. |
| 2013/0159253 A1 | 6/2013 | Dewall et al. |
| 2013/0232153 A1 * | 9/2013 | Dhuse ................ G06F 11/10 707/741 |
| 2013/0254164 A1 | 9/2013 | Tsofi et al. |
| 2014/0052761 A1 * | 2/2014 | Teitelbaum ........... G06F 16/211 707/803 |
| 2014/0101298 A1 | 4/2014 | Shukla et al. |
| 2014/0195514 A1 | 7/2014 | Stein |
| 2014/0279844 A1 | 9/2014 | Shukla et al. |
| 2014/0297776 A1 * | 10/2014 | Volvovski ............ G06F 16/182 709/212 |
| 2014/0304371 A1 | 10/2014 | Mraz et al. |
| 2014/0359348 A1 * | 12/2014 | Volvovski ................ G06F 3/06 714/6.22 |
| 2015/0026189 A1 | 1/2015 | Li et al. |

(56) References Cited

U.S. PATENT DOCUMENTS

| | | | |
|---|---|---|---|
| 2015/0154074 | A1* | 6/2015 | Resch .................. G06F 16/00 714/764 |
| 2015/0195162 | A1 | 7/2015 | Gandham et al. |
| 2015/0269239 | A1 | 9/2015 | Swift et al. |
| 2015/0304983 | A1 | 10/2015 | Krening et al. |
| 2016/0034433 | A1 | 2/2016 | Yamat et al. |
| 2016/0321588 | A1 | 11/2016 | Das et al. |
| 2016/0342645 | A1 | 11/2016 | Tempero et al. |
| 2017/0068713 | A1 | 3/2017 | Joshi et al. |
| 2017/0123948 | A1* | 5/2017 | Dhuse .................. G06F 3/0619 |
| 2017/0199770 | A1 | 7/2017 | Peteva et al. |
| 2017/0201597 | A1 | 7/2017 | Narasimhan et al. |
| 2017/0220651 | A1 | 8/2017 | Mathew et al. |
| 2017/0286180 | A1 | 10/2017 | He et al. |
| 2017/0293540 | A1 | 10/2017 | Mehta et al. |
| 2017/0308562 | A1 | 10/2017 | Sreekantaiah et al. |
| 2017/0308601 | A1 | 10/2017 | Massarenti et al. |
| 2017/0318085 | A1 | 11/2017 | Shukla et al. |
| 2017/0364345 | A1 | 12/2017 | Fontoura et al. |
| 2018/0150331 | A1 | 5/2018 | Chen et al. |
| 2018/0316752 | A1 | 11/2018 | Hodges et al. |
| 2019/0163391 | A1 | 5/2019 | Annamalai et al. |
| 2019/0166019 | A1 | 5/2019 | Jagadeesh |
| 2019/0171737 | A1 | 6/2019 | Duan et al. |
| 2019/0196878 | A1 | 6/2019 | Li |
| 2019/0340166 | A1 | 11/2019 | Raman et al. |
| 2019/0340167 | A1 | 11/2019 | Raman et al. |
| 2019/0340168 | A1 | 11/2019 | Raman et al. |
| 2019/0340265 | A1 | 11/2019 | Raman et al. |
| 2019/0340291 | A1 | 11/2019 | Raman et al. |
| 2019/0342188 | A1 | 11/2019 | Raman et al. |
| 2019/0342379 | A1 | 11/2019 | Shukla et al. |
| 2019/0342380 | A1 | 11/2019 | Thota et al. |

FOREIGN PATENT DOCUMENTS

| | | |
|---|---|---|
| WO | 9735270 A1 | 9/1997 |
| WO | 2008100795 A1 | 8/2008 |
| WO | 2010048595 A2 | 4/2010 |

OTHER PUBLICATIONS

Moon et al., "Introducing SSDs to the Hadoop MapReduce Framework", 2014, IEEE. (Year: 2014).*

Kraska, et al, "Consistency Rationing in the Cloud: Pay only when it matters", 2009, ACM. (Year: 2009).*

Xue et al., "COMET: Client-Oriented METadata Servcie for Highly Available Distributed File Systems", 2015, IEEE. (Year: 2015).*

D. Kossmann, "The State of the Art in Distributed Query Processing", 2000, ACM. (Year: 2000).*

"Non Final Office Action Issued in U.S. Appl. No. 15/991,632", dated Jan. 24, 2020, 23 Pages.

"Final Office Action Issued in U.S. Appl. No. 15/991,953", dated Feb. 14, 2020, 24 Pages.

Likness, Jeremy, "Getting Behind the 9-Ball: Cosmos DB Consistency Levels Explained", Retrieved From: https://blog.jeremylikness.com/blog/2018-03-23_getting-behind-the-9ball-cosmosdb-consistency-levels/, Mar. 23, 2018, 8 Pages.

Montazerolghaem, et al., "Overload Control in SIP Networks: A Heuristic Approach based on Mathematical Optimization", In Proceedings of Global Communications Conference (GLOBECOM), Dec. 6, 2015, 6 pages.

"International Search Report and Written Opinion Issued in PCT Application No. PCT/US2019/031207", dated Jul. 19, 2019, 13 Pages.

"International Search Report and Written Opinion Issued in PCT Application No. PCT/US2019/031204", dated Jul. 19, 2019, 14 Pages.

"International Search Report and Written Opinion Issued in PCT Application No. PCT/US2019/031208", dated Jul. 24, 2019, 15 Pages.

"Non Final Office Action Issued in U.S. Appl. No. 15/991,953", dated Aug. 22, 2019, 21 Pages.

"Conflict Resolution", Retreived from https://web.archive.org/web/20120402192233/https:/docs.oracle.com/cd/E11882_01/server.112/e10706/repconflicts.htm, Apr. 2, 2012, 28 Pages.

"Conflict Resolution", Retrieved from https://docs.oracle.com/cd/F49540_01/DOC/server.815/a67791/ch6.htm, Retrieved Date: Aug. 31, 2018, 43 Pages.

"Conflict Resolution Concepts and Architecture", Retrieved from https://docs.oracle.com/cd/B10500_01/server.920/a96567/repconflicts.htm, Nov. 15, 2011, 35 Pages.

"Couchbase Server: Schemaless Data Modeling", Retrieved from https://developer.couchbase.com/documentation/server/3.x/developer/dev-guide-3.0/schemaless.html, Retrieved Date: Nov. 20, 2017, 5 Pages.

"Lotus Notes/Domino Replication Conflict Solver", Retrieved from https://web.archive.org/web/20100306134644/http://www.ytria.com/WebSite.nsf/WebPageRequest/Solutions_scanEZ_ConflictSolveren, Dec. 15, 2005, 2 Pages.

"Master Replication Concepts and Architecture", Retrieved from https://docs.oracle.com/cd/B10501_01/server.920/a96567/repmaster.htm, Feb. 17, 2012, 40 Pages.

"Master-master vs Master-slave Database Architecture?", Retrieved from https://stackoverflow.com/questions/3736969/master-master-vs-master-slave-database-architecture, Retrieved Date: Jul. 2, 2018, 8 Pages.

"Master-to-Slave Replication", Retrieved from https://www.ibm.com/support/knowledgecenter/en/POWER8/p8ha1/example2mastertoslavereplication.htm, Retrieved Date: Jul. 3, 2018, 4 Pages.

"Replica Set Elections", Retrieved from https://docs.mongodb.com/manual/core/replica-set-elections/, Retrieved Date: Jul. 2, 2018, 6 Pages.

Afriansyah, et al., "Model of Load Balancing Using Reliable Algorithm With Multi-Agent System", In Journal of IOP Conference Series: Materials Science and Engineering, vol. 190, Issue 1, Apr. 2017, 9 Pages.

Ardagna, et al., "SLA Based Resource Allocation Policies in Autonomic Environments", In Journal of Parallel and Distributed Computing, vol. 67, Issue 3, Mar. 1, 2007, pp. 259-270.

Fernandez, et al., "Autoscaling Web Applications in Heterogeneous Cloud Infrastructures", In Proceedings of IEEE International Conference on Cloud Engineering, Mar. 11, 2014, 11 Pages.

Gunda, et al., "Multi-master at global scale with Azure Cosmos DB", Retrieved from https://docs.microsoft.com/en-us/azure/cosmos-db/multi-region-writers, May 7, 2018, 9 Pages.

Liu, et al., "Consistency as a Service: Auditing Cloud Consistency", In Journal of IEEE Transactions on Network and Service Management, vol. 11, Issue 1, Mar. 2014, pp. 25-35.

Masha, et al., "Implement a Custom Conflict Resolver for a Merge Article", Retrieved from https://docs.microsoft.com/en-us/sql/relational-databases/replication/implement-a-custom-conflict-resolver-for-a-merge-article?view=sql-server-2017, Mar. 14, 2017, 6 Pages.

Patra, Chandan, "How to Use Consistency Models for Amazon Web Services", Retrieved from https://cloudacademy.com/blog/consistency-models-of-amazon-cloud-services/, Jun. 3, 2016, 9 Pages.

Shukla, et al., "Schema-Agnostic Indexing with Azure DocumentDB", In Proceedings of 41st International Conference on Very Large Data Bases, vol. 8, Issue 12, Aug. 1, 2015, pp. 1668-1679.

Singh, et al., "Server-Storage Virtualization: Integration and Load Balancing in Data Centers", In Proceedings of ACM/IEEE Conference on Supercomputing, Nov. 15, 2008, 12 Pages.

Thomsen, Jakob Holdgaard, "UBER Engineering: The Architecture of Schemaless, Uber Engineering's Trip Datastore Using MySQL", Retrieved from https://eng.ubercom/schemaless-part-two/, Jan. 15, 2016, 8 Pages.

"Final Office Action Issued in U.S. Appl. No. 15/991,632", dated May 19, 2020, 22 Pages.

"Non-Final Office Action Issued in U.S. Appl. No. 15/991,880", dated Jun. 10, 2020, 37 Pages.

Chan et al., "Taming XPath Queries by Minimizing Wildcard Steps", in Proceedings of the 30th VLDB Conference, Aug. 31, 2004, pp. 156-167.

(56) References Cited

OTHER PUBLICATIONS

He et al., "Query Language and Access Methods for Graph Databases", In Book Managing and Mining Graph Data, 2010, pp. 125-160.
Buckler, Craig, "How to Convert XML to a JSON-Like JavaScript Object", Retrieved From: http://www.sitepoint.com/how-to-convert-xml-to-a-javascript-object, Oct. 20, 2011, 9 Pages.
"Non Final Office Action Issued in U.S. Appl. No. 15/991,953", dated Jul. 16, 2020, 24 Pages.
"Notice of Allowance Issued in U.S. Appl. No. 15/991,062", dated Mar. 18, 2020, 9 Pages.
"Non Final Office Action Issued in U.S. Appl. No. 15/991,223", dated Apr. 9, 2020, 15 Pages.
"Notice of Allowance Issued in U.S. Appl. No. 15/991,632", dated Dec. 10, 2020, 10 Pages.

\* cited by examiner

SCHEMA-AGNOSTIC INDEXING OF DISTRIBUTED DATABASES

CROSS-REFERENCE TO RELATED APPLICATIONS

This application is a continuation of, and claims priority under 35 U.S.C. §§ 119-120 to, U.S. Patent Application No. 62/668,226, entitled "DISTRIBUTED DATABASES," filed on May 7, 2018, the entirety of which is hereby incorporated by reference as if fully rewritten herein.

BACKGROUND

Within the field of computing, many scenarios involve a data set that is stored by a collection of servers, such as a database that is distributed over a number of database servers. The data set may be distributed over a number of collocated servers, such as a server cluster; over a number of locations within a region, such as a locally distributed database; and/or over a number of regions, such as a globally distributed database. Each server typically stores a set of records (e.g., rows of a database or objects of an object set) and a data index that enables the server to expedite the retrieval of a record upon request.

In some scenarios, the data set may be provided by the set of servers to serve an application, such as a website that is to be accessed through the web browsers of a number of devices, or a specific executable client that is tightly coupled with the data set and that executes on a number of devices. In such scenarios, the manner of distributing the set of servers may cause the application to exhibit a variety of performance characteristics, such as read latency (e.g., the speed with which the set of servers, and by extension the application, responds to read or data retrieval requests); write latency (e.g., the speed with which the set of servers, and by extension the application, responds to updates of the data set); resiliency (e.g., the ability of the set of servers to retain data and maintain availability in response to a failure of a server or a server subset); and concurrency (e.g., the ability of the set of servers to scale up to handle a greater volume of demand). Moreover, different applications may have different sensitivities to various performance characteristics. For example, a first application may be highly sensitive to data loss and relatively tolerant of high latency, while a second application may prioritize a reduction of latency over concurrency and scalability. Techniques such as replication may be utilized to promote the satisfactory performance of the data set for the application; e.g., increasing demand for data (e.g., due to increasing popularity of the application) may be handled by adding replicas of the server that promote concurrent fulfillment of retrieval requests.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The architecture of a set of servers may be selected to suit the performance characteristics of an application. For example, in order to provide satisfactory performance for a particular application, the set of servers may be designed and/or adapted to grow, decrease, refactor, or otherwise alter the set of servers. Some such alterations may reflect a choice among competing interests. For example, increasing a replica count of servers storing a particular subset of the data set may promote resiliency (e.g., the capability to recover from the failure of one server) and/or concurrency, but at the expense of increasing write latency (e.g., since the updated data has to be written to and committed by a larger number of servers).

A typical server maintains a tight binding between stored data and the data index applied thereto; e.g., a server cluster may comprise a set of one hundred servers, each storing a replica or subset of the data set and a data index that indicates the location of the records on the server. Typically, the data index stored by a server is only applicable to and only used by the server. However, this architecture may be problematic for several reasons. For example, the server is tasked both with maintaining the index and with storing and providing access to the data, which may impose two distinct types of computational load on the server: the tasks involved in indexing (e.g., generating and maintaining the index, indexing new and updated records, and maintaining synchrony of the index with other servers) and the tasks involved in storing the records (e.g., generating and maintaining the data store and fulfilling requests to access and/or alter particular records). As a result, techniques such as load-balancing may be difficult to apply to the server, particularly in view of the variable data access patterns of applications.

It may be advantageous, for numerous reasons, to decouple the data index from the storage of records. That is, the set of servers may be partitioned into storage servers that store and provide the records of the data set and index servers that store and utilize the index over the data set. A first server of the set of servers may be selected as an index server, and a second server of the set of servers may be selected as a storage server. Updates to the data set, including the addition, updating, and deletion of records, may be routed to the index server and automatically indexed, including an indication by the index server of the location of the record (e.g., which storage server of the set of servers stores the records of the data set).

Decoupling the index server(s) from the storage server(s) may provide any, several, or all of a number of technical advantages. As a first such example, the decoupling of the index server enables numerous new configurations of the set of servers, such as a centralized index server cluster that indexes a data set that is distributed over a variety of distributed storage servers, and an index server subset for a storage server cluster that is partially local to the storage server cluster and partially remote from the storage server cluster to handle data workloads with different performance characteristics. As a second such example, the decoupling of the index server from the storage server enables load-balancing techniques to be applied differently to the indexing and storage; e.g., a set of servers that is exhibiting inadequate indexing performance for an application but adequate storage performance for the application may be adjusted by scaling up the number of index servers while holding the number of storage servers constant. As a third such example, decoupling the index server and storage server may promote resiliency of the set of servers; e.g., a loss of an index server may be addressed by provisioning a new index server and rebuilding the index over the storage set, while the loss of a storage server may be addressed by examining the index server to determine the data that was stored by the storage server to expedite recovery. Both processes may promote recovery as compared with architectures featuring a tightly coupled index and storage on each server, where both components of a failed server may have to be rebuilt. As a fourth such example, decoupling the index server and storage server may promote schema-independence and performance of the indexing; e.g., the data layout of the index on the index servers may be selected and adapted independently of the data layout of the records by the storage servers and/or a schema exhibited by the data set.

The currently presented techniques may be utilized by a variety of embodiments. In a first such embodiment, an index server may provide access to a data set stored by a set of servers. The index server may comprise a processor a memory that stores a data set index and a set of instructions that, when executed by the processor, cause the index server to utilize the techniques presented herein. In particular, the execution of the instructions causes the server to receive a record to be stored by a storage server of the set and add, to the data set index, the record including an indication of the storage server that stores the record. The execution of the instructions also causes the index server to evaluate a query over the data set that involves the record by identifying, among the servers of the set, the storage server of the set that stores the record, and initiating a fulfillment of the query by the storage server.

In a second such embodiment, an index server of a set of servers may be configured to utilize a method of storing a data set on the set. The method involves configuring an index server of the set to receive a record to be stored by a storage server of the set, and add the record to a data set index of the index server, including an indication of the storage server that stores the record. The method further comprises configuring the index server to evaluate a query over the data set that involves the record by identifying, among the servers of the set, the storage server of the set that stores the record, and initiating a fulfillment of the query by the storage server.

In a third such embodiment, a set of servers may be configured to provide a data set according to the following method. The method comprises selecting, from the set, a storage server of the data set; and selecting, from the set, an index server subset of index servers comprising a first index server and a second index server of the data set, wherein the index server subset excludes the storage server. The method further comprises configuring the first index server to receive a record to be stored by a storage server of the set; add the record to a data set index of the index server, including an indication of a location of the record in the set; synchronize the data set index with the second index server; and route queries over the data set to the storage server of the set that stores records of the data set that are involved in the query. Many such embodiments may be devised that provide access to a data set in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
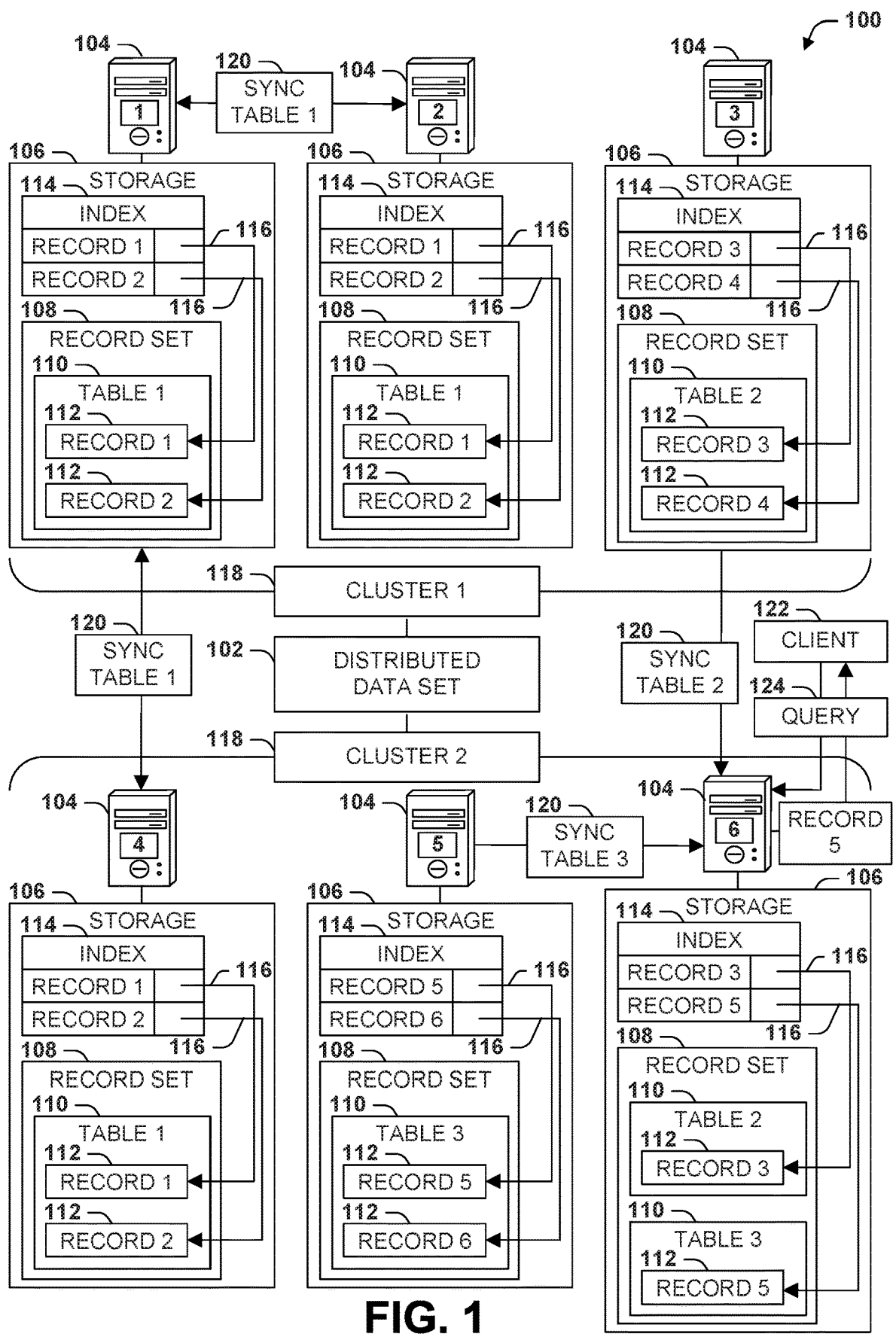
FIG. 1 is an illustration of a set of example scenarios respectively featuring a typical server set architecture for a data set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

FIG. 1 is an illustration of an example scenario 100 featuring a data set 102 that is typically distributed over a set of servers 104. In this example scenario 100, the servers 104 comprise storage 106 that stores a portion of the data set 102, such as a record set 108 comprising a collection of records 112 within one or more tables 110 of a database. The servers 104 are also organized into server clusters 118, such as a first set of three servers 104 comprising a first server cluster 118 and a second set of three servers 104 comprising a second server cluster 118. Each cluster 118 may comprise, e.g., a rack in a server space; a building within a region; or a region in a particular part of the world.

In some instances, two or more servers 104 may store replicas of a selected portion of the data set 102, such as the first server 104, the second server 104, and the fourth server 104 that each store a first record 112 and a second record 112 of a table 110. The servers 104 may conduct a synchronization 120 to ensure that updates to one of the records 112 at one of the servers 104 is propagated to the other servers 104 storing the updated record 112. Such synchronization 120 may occur within a server cluster 118 (e.g., between the first server 104 and the second server 104) and/or across server clusters 118 (e.g., between the first server 104 and the fourth server 104).

Alternatively or additionally, some servers 104 may store a distinct subset of records 112 of the data set 102 that is only partially replicated with servers 104, or that is not replicated at all and is only stored by a single server 104. For example, the sixth server 104 stored a first record 112 that is replicated at the third server 104 and a fifth record 112 that is replicated at the fifth server 104, and synchronization 120 may be performed thereamong to maintain synchrony of the replicated records 112; additionally, both the third server 104 and the fifth server 104 store a record 112 that only exists on the third and fifth servers 104 respectively.

In this example scenario 100, each server 104 also stores an index 114 that facilitates access to the records stored by the server 104. For example, a first server 104 stores a first record 112 and a second record 112, and also an index 114 that contains references 116 to the locations of the first record 112 and the second record 112 within the first server 104 (e.g., a hashtable that associated a hashcode of a key of the first table 110 with a memory address indicating the location of the corresponding record 112 within the storage 106 of the first server 104). By generating, maintaining, and utilizing an index 114 over the locally stored records 112, each server 104 may expedite access to its locally stored records 112. For example, when a client 122 submits a query 124 to a server 104, the server 104 may identify a record 112 that is involved in the query 124; calculate the hashcode of the key of the record 112; utilize the index 114 to identify the memory address of the corresponding record 112; retrieve the record 112 at the identified address; and return the record 112 to the client 122 to fulfill the query 124. In this manner, each server 104 may utilize an index 114 to facilitate access to the locally stored records 112.

However, the typical server architecture illustrated in the example scenario 100 of FIG. 1 may exhibit a variety of limitations. Such limitations may arise, in whole or in part, from the tight coupling of the indices 114 with locally stored records 112 for each server 104.

As a first such example, each server 104 is allocated two distinct tasks: providing access to the records 112 and generating, maintaining, and utilizing the index 114. However, some applications of the data set 102 may rely heavily upon the use of the index 114, such as query-intensive applications that may be fulfilled by analyzing the contents of the index 114 and/or highly dynamic applications in which the locations of the records 112 change frequently and therefore involve frequent updates of the index 114. Other applications of the data set 102 may rely more heavily on access to the record set 108 (e.g., retrieval of large objects, such as media streams) and only sparsely upon the use of the index 114 (e.g., comparatively simple queries over comparatively static records 112). However, because the indices 114 are tightly coupled with the locally stored record sets 108, it may be difficult to adjust the server collection in view of only one of these properties. For example, if the distributed data set 102 is significantly limited by indexing performance, it may not be possible or convenient to provide additional servers 104 that only scale up indexing; rather, the capacity of newly provisioned servers 104 may be divided between supplemental indexing capabilities and supplemental storage 106 of records 112 that does not appreciably promote performance. Alternatively, if the distributed data set 102 is significantly limited by access to records 112, it may not be possible or convenient to provide additional servers 104 that only scale up record storage; rather, the capacity of newly provisioned servers 104 may be divided between supplemental storage capabilities and supplemental indexing capabilities that do not appreciably promote performance.

As a second such example, the tight coupling of the indices 114 and the record sets 108 of each server 104 may limit the architectural options of the distribution of the set of servers. For example, a record 112 may be stored in the first cluster 118 by a server 104 that stores an index 114 of the record 112. It may be desirable to move the record 112 to a server 104 of the second cluster 118, but to maintain a reference 116 from the index 114 in the first cluster 118 to the location of the record 112 in the second cluster 118. However, the tight coupling of the indices 114 and the record sets 108 on each server 104 may not enable any of the indices 114 of the first cluster 118 to store a reference 116 to a record 112 that does not locally exist on the corresponding server 104, but that only exists on a server 104 of the second cluster 118.

As a third such example, a tight coupling of indices 114 and record sets 108 may limit recovery from faults, such as server failures. For example, the sixth server 104 in this example scenario 100 fails, e.g. due to fire, theft, a critical operating system fault, or corruption of storage 106. It may be desirable to perform an automated reconstruction of the sixth server 104, e.g., by provisioning a spare server 104 and reloading the records 112 and index 114 previously stored by the sixth server 104. However, the sixth server 104 stored replicas of the third record 112 stored by the third server 104 and the fifth record 112 stored by the fifth server 104. It may be difficult to make this determination of the contents of the failed server 104 based solely on the information stored by the other five servers 104, as both the index 114 and the record set 108 of the sixth server 104 only existed in the storage 106 of the sixth server 104. The absence of such information on any of the other servers 104 may lead to a delay or prevention of an automated reconstruction of the sixth server 104. Even more significant problems may arise if an entire cluster 118 fails, e.g., due to a rack-, building-, or region-wide disaster or a broad-scale network failure.

As a fourth such example, in multitenant scenarios, each server 104 may store a collection of records 112 for different clients 122. It may be desirable to generate an index 114 over all of the records 112 of a particular server 104 for all clients 122, and/or an index 114 over all of the records 112 for a particular client 122 over all such servers 104. Due to security reasons, it may be desirable to control the location of the index 114; e.g., to prevent unauthorized access to a server 104 from disclosing an index 114 over all of the records 112 of the server 104 for all clients 122 and/or the locations of all records 112 for a particular client 122 across the entire set of servers. Accordingly, it may be desirable to choose a particular location in which the index 114 over one or more servers 104 is stored. However, such selection may be difficult due to the tight coupling of indices 114 and servers 104.

As a fifth such scenario, the collocation of the record set 108 and the index 114 on a particular server 104 may create interdependencies, such as the physical layout. For example, if the layout of the storage 106 of a particular server 104 is selected to promote access to the record set 108 (e.g., a file system that is well-suited for sequential access in accordance with records 112 that are primarily accessed in a streaming manner), the same layout may have to be used for a collocated index 114 that is not typically accessed in a streaming manner, leading to diminished performance. Conversely, changing the layout of storage 106 to promote the performance of the index 114 may reduce the performance of accessing the record set 108. The tight coupling of the index 114 and the record set 108 may therefore limit the options for independently choosing the layouts thereof. These and other disadvantages may arise due to the limitations of the typical server configuration in the example scenario 100 of FIG. 1.

B. Presented Techniques

In view of the limitations of a typical server configuration featuring a tight coupling of indices 114 and locally stored records 112, it may be desirable to provide an architecture in which the indexing capabilities of the set of servers are distinct from the storage capabilities of the set of servers. The decoupling of indexing and storage of the data set 102 may enable a range of novel server architectures that may be advantageous in a variety of circumstances.

Figure 2:
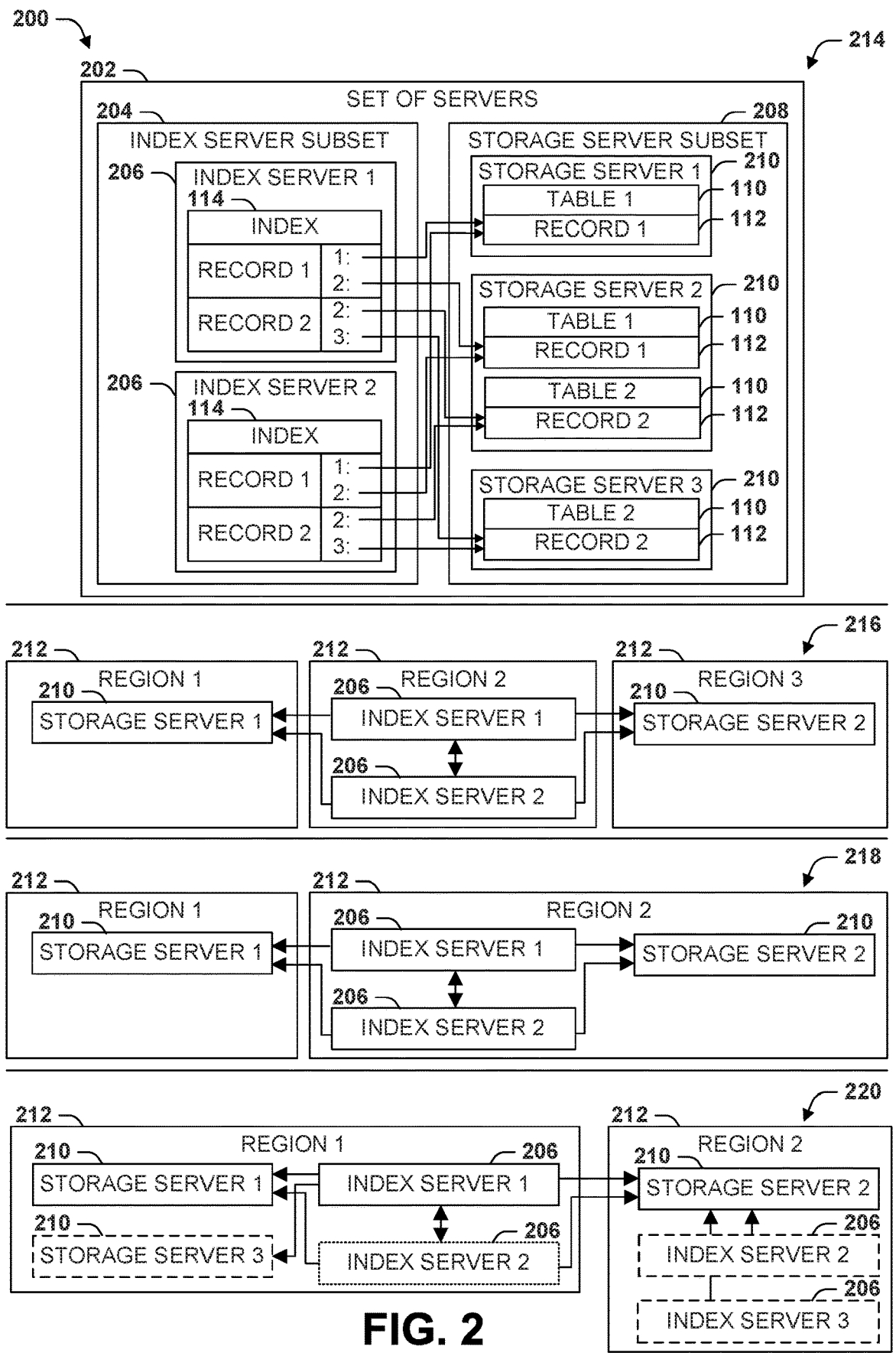
FIG. 2 is an illustration of an example scenario featuring a server set architecture including a decoupled index server subset and storage server subset in accordance with the techniques presented herein.

FIG. 2 is an illustration of a set 200 of example scenarios involving a distributed server architecture in accordance with the techniques presented herein. An example 214 of a set 202 comprises a variety of servers 104 that are partitioned into a storage server subset 208 comprising a set of storage servers 210 that store records 112 of the data set 102 and an index server subset 204 comprising index servers 206 that store indices 114 of records 112 of the data set 102. Rather than generating, maintaining, and utilizing an index 114 over locally stored records 112, each index server 206 generates, maintains, and utilizes an index 114 of the records 112 stored by at least some of the storage servers 210. In some such scenarios, an index server 206 may comprise index replicas, such that a first index server 206 and a second index server 206 store identical indices 114 that are synchronized, such that one a first index server 206 receives an update of the records, the first index server 206 updates the index 114 and then propagates the update to the second index server 206 and vice versa. Alternatively or additionally, an index server 206 may partition the index 114 such that a first index server 206 indexes a first subset of records 112 (e.g., stored by a first subset of storage servers 210) and a second index server 206 indexes a second, distinct subset of records 112 (e.g., stored by a second subset of storage servers 210). In some variations, the index servers 206 may automatically index the records 112 of the data set 102 upon receipt of the records 112 into the data set 102.

This decoupled architecture may provide a variety of potential advantages, as shown in the other example scenarios of FIG. 2. In a first such scenario 216, a first storage server 210 may be provided in a first region 212 and a second storage server 210 may be provided in a third region 212. It may be desirable to locate one or more index servers 206 in a second region 212 that is distant from both the first region 212 and the second region 212 (e.g., the second region 212 may comprise a higher-security location than the first region 212 and the third region 212, such that theft of either the first storage server 210 or the third storage server 210 may preclude a disclosure of the index 114 of either storage server 210). Additionally, collocating the index servers 206 in the second region 212 may promote rapid synchronization between the indices 114, e.g., where an application is critically limited by a commit rate of a particular change to the data set 102 across all indices 114. Such performance may be difficult to achieve, e.g., if the indices 114 are distributed across the first region 212 and the third region 212. However, the decoupling of the indexing and storage functions of the data set 102 by partitioning the set 202 into index server 206 and storage servers 210, may enable an individual selection and disposition of the servers 104 in the selected regions 212.

Another potential advantage that may arise from this first example scenario 216 involves the resiliency of the set 202. In this example scenario, if the first region 212 is involved in a failure, such as a regional network failure and/or a destruction of a server cluster 118 including the first storage server 210, the placement of the index servers 206 for the first storage server 210 in the second region 212 enables a rapid identification of the records 112 that were stored on the first storage server 210. Such records 112 may then be more rapidly reconstructed, or at least a determination may be made of the extent of irrecoverable data, in contrast with the example scenario 100 of FIG. 1 in which it may be difficult to determine the contents of the sixth server 104 after a failure. Similarly, if the second region 212 is involved in a failure that involves the loss of both index servers 206, recovery may be achieved simply by re-indexing the first storage server 210 and the second storage server 210 over replacement index servers 206. In this manner, the decoupling of the indices 114 of the index servers 206 and the records 112 stored by the storage servers 210 may present an architecture for which fault recovery may be more readily implemented.

In a second such scenario 218, a first storage server 210 may be provided in a first region 212 and a second storage server 210 may be provided in a second region 212. A query-intensive operation may be conducted by an application that is located in the second region 212, wherein access to the indices 114 in a location that is proximate to the application may significantly promote the performance of the query-intensive operation. Alternatively or additionally, a variety of queries may initiate in the second region 212 that may be fulfilled by the collection of index servers 206, and it may be anticipated that many such queries will involve records stored by the second storage server 210, while few queries will involve records stored by the first storage server 210. As an example, the data set 102 may be partitioned into a second storage server 210 that comprises recent and frequently accessed data and a first storage server 210 that comprises archival and infrequently accessed data. A balanced consideration of the availability, load, and/or costs of server selection may suggest, as an advantageous architecture, the location of the entirety of the index 114 and the second storage server 210 in the second region 212 proximate to the application, and a remote location of the first storage server 210 in the remote first region 212. Such architecture may not be possible using the typical, tightly coupled architecture in the example scenario 100 of FIG. 1, but may be achieved by the example 214 of FIG. 2 featuring a decoupling of the indexing and storage functions of the set 202, in which the locations of the index servers 206 may be selected independently of the locations of the storage servers 210 that are indexed by the index servers 206.

In a third such example 220, a first region 212 initially comprises a first storage server 210 and a second region 212 initially comprises a second storage server 210, and the first region 212 may also comprise a first index server 206 and a second index server 206 that respectively index the first storage server 210 and the second storage server 210. An analysis of the applications utilizing the records 112 stored by the second storage server 210 may reveal that the indexing of the storage server 210 exhibits a deficiency—e.g., a query-intensive operation applied to the index servers 206 in the first region 212 from clients within the second region 212 may exhibit poor performance—but that the performance of accessing the records 112 through the second storage server 210 is adequate. Accordingly, the second index server 206 may be relocated to the second region 212, and a third index server 206 may be provisioned at the second region 212 as a replica of the second index server 206, which may provide a significant performance gain experienced by the clients within the second region 212. Conversely, a third storage server 210 may be allocated as a replica of the first storage server 210, and the first index server 206 may be extended to add indexing of the third storage server 210 (optionally while refraining from adding the indexing to the second index server 206 and/or the third index server 206 that are located in the second region 212). In this manner, the adaptability of the servers 104 for the performance characteristics of the data set 102 and applications may be selectively targeted to the indexing and/or storage capabilities of the set 202, while reducing an inefficient concomitant scaling of indexing and/or storage capabilities that may not affect performance, as may occur in tightly coupled architectures such as the example scenario 100 of FIG. 1.

C. Technical Effects

A first technical effect that may arise from the techniques presented herein involves the expansion of architectural options of each server 104 of the set 202. As a first such example, an architecture featuring a decoupling of indexing and storage, via a partitioning of the set 202 into an index server subset 204 and a storage server subset 208, may enable the location of each server 104 to be individually selected; i.e., the location of an index 114 of a selected set of records 112, and of the index server 206 storing such an index 114, may be selected to coincide with and/or differ from the location of the records 112 stored by the storage server 210. Such selectivity may promote performance, scalability, efficiency, and/or security, as illustrated in the example scenarios of FIG. 2.

A second technical effect that may arise from the techniques presented herein involves the adaptability of the set 202 to changing circumstances, such as load-balancing. As a first such example, if an analysis of the data set 102 indicates that performance of an application is selectively limited by the indexing capabilities of the set 202, additional index servers 206 may be provisioned that are wholly dedicated to indexing and that directly promote indexing performance. Similarly, if an analysis of the data set 102 indicates that performance of an application is selectively limited by the storage capabilities of the set 202, additional storage servers 210 may be provisioned that are wholly dedicated to indexing and that directly promote indexing performance. As a further example, an individual index server 206 or storage server 210 may be relocated closer to an application that is dependent upon a particular indexing or storage functionality while maintaining the locations of other index servers 206 and/or storage servers 210 of the set 202. These architectural variations may be advantageous over provisioning additional typical servers 104 (such as in the tightly coupled architecture in the example scenario 100 of FIG. 1) that partly expand index performance and partly expand storage capacity that does not significantly affect application performance. These architectural variations may be advantageous over provisioning additional typical servers 104 (such as in the tightly coupled architecture in the example scenario 100 of FIG. 1) that partly expand index performance and partly expand storage capacity that does not significantly affect application performance.

As a converse example, the indexing and/or storage capacity of a particular architecture may be determined to be excessive for a particular application. It may be desirable to economize the allocation of resources for an application by selectively scaling back the indexing or storage capability, e.g., by decommissioning an index server 206 or storage server 210 and/or relocation to a more remote region 212 in a manner that reduces resource utilization while maintaining satisfactory performance. These architectural variations may be advantageous over the tightly coupled typical servers 104 (such as in the tightly coupled architecture in the example scenario 100 of FIG. 1), in which decommissioning or relocating a particular server affects both indexing and storage capacity.

A third technical effect that may arise from the techniques presented herein involves the resiliency of the set 202 in response to faults. As explained with reference to the first example scenario 216 of FIG. 2, the disposition of the index servers 206 and the storage servers 210 in different regions 212 may promote recovery in the event of a failure of any such region 212. If a region 212 involving a storage server 210 exhibits a failure, the remote disposition of one or more index server(s) 206 over the storage server 210 may enable a rapid determination of the records 112 that were stored by the storage server 210, and in some cases may expedite the provisioning of a substitute storage server 210 from a distant replica of the failed storage server 210. Alternatively, if a fault occurs in the second region 212 comprising the index servers 206, the indices 114 stored thereby may be rapidly rebuilt by re-indexing the records 112 stored by the storage servers 210 in each region 212. These recovery techniques are promoted by the decoupled architecture of the index servers 206 and storage servers 210, as compared with the collocation inherent in the tightly coupled architecture in the example scenario 100 of FIG. 1. Many such advantages may arise from the decoupling of the indexing and storage capabilities of the data set 102 via the partitioning of the index servers 206 and the storage servers 210 of the set 202 in accordance with the techniques presented herein.

D. Example Embodiments

Figure 3:
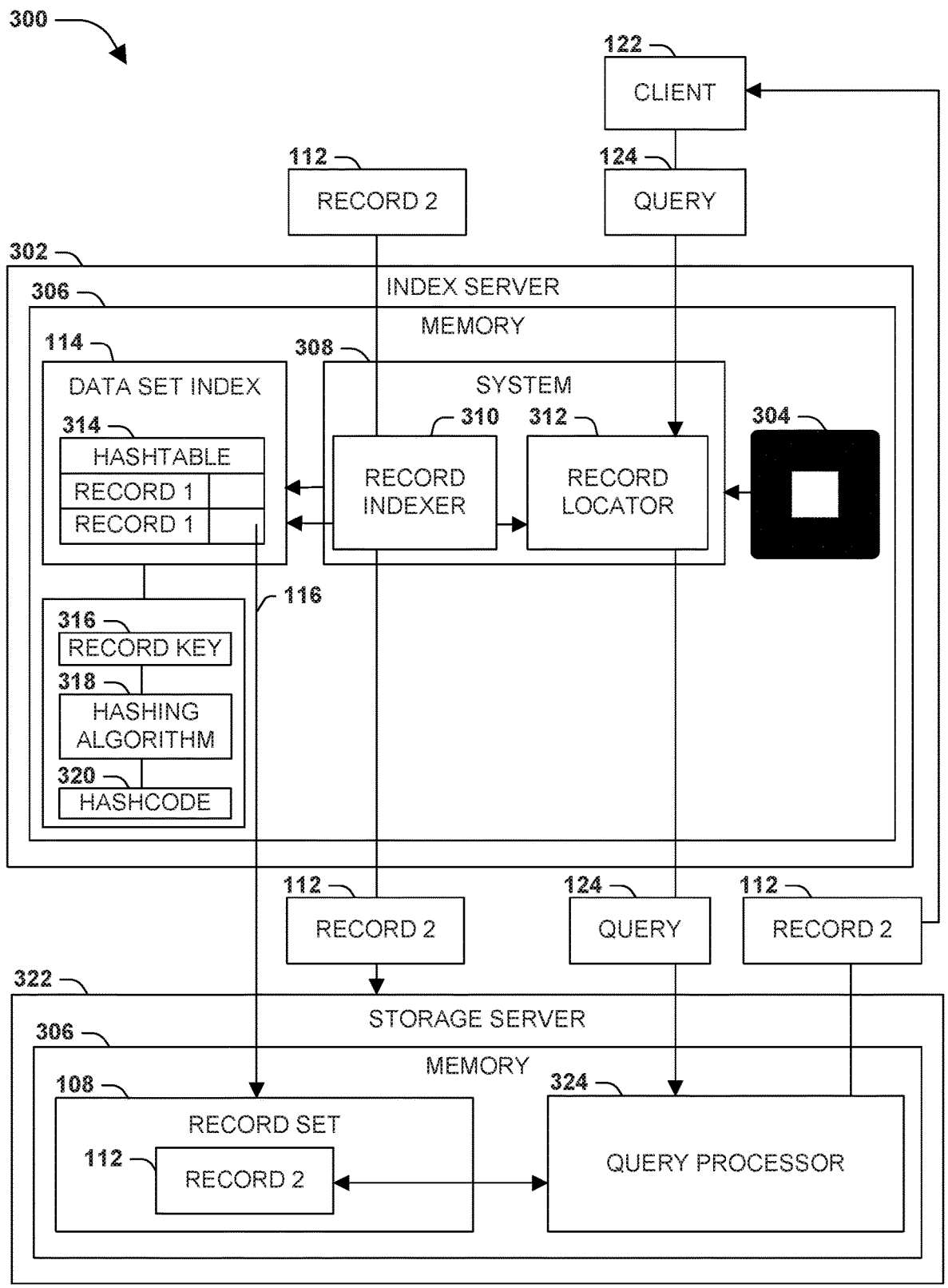
FIG. 3 is a component block diagram illustrating an example index server of an index server subset that indexes a storage server of a set of servers in accordance with the techniques presented herein.

FIG. 3 is an illustration of an example scenario 300 featuring some example embodiments of the techniques presented herein, including an example index server 302 that provides access to records 112 of a data set 102 stored by a set 202 in accordance with the techniques presented herein. The example index server 302 comprises a processor 304 and a memory 306 (e.g., a memory circuit, a platter of a hard disk drive, a solid-state storage device, or a magnetic or optical disc) storing a data set index 114 and a set of instructions that, when executed by the processor 304 of the example index server 302, cause the example index server 302 to provide access to the data set 202 in accordance with the techniques presented herein. In this example scenario 300, the instructions encode the components of a system 308, wherein the interoperation of the components of the system 308 causes the example index server 302 to provide access to the data set 202 in accordance with the techniques presented herein.

The example system 308 comprises a record indexer 310 that receives a record 112 to be stored by a particular storage server 322 of the set 202, and that adds the record 112 to the data set index, indicating the storage server 322 that stores the record 112. For example, the data set index 114 may comprise a hashtable 314, and the record indexer 310 may invoke a hashing algorithm 318 to calculate a hashcode 320 of a record key 316 of the record 112 and store, at a location in the hashtable 314 associated with the hashcode 320, a reference 116 to the particular storage server 322 that stores the record 112. The record indexer 310 may also forward the record 112 to the particular storage server 322 for storage; alternatively (not shown), the record 112 may be concurrently and/or consecutively disseminated by a source to both the index server 302 and the particular storage server 322. The system 308 may also comprise a record locator 312 that evaluates a query 124 over the data set 102 submitted by a client 122 by identifying, among the storage servers 210 of the server set, a particular storage server 322 that stores the record 112 (e.g., according to the hashtable 314 of the data set index 114), and that initiates a fulfillment of the query 124 by the particular storage server 322. For example, the record locator 312 may forward the query 124 to the particular storage server 322 as a request to provide the record 112 to the client 122, such that the particular storage server 322 may forward the record 112 to the client 122 to fulfill the query 124. Alternatively (not shown), the record locator 312 may inform the client 122 of the particular storage server 322 that stores the record 112 involved in the query 124, such that the client 122 may initiate the query 124 directly with the particular storage server 322. In these and other variations, the index server 302 may provide access to the data set 102 and the record 112 stored by the particular storage server 322 in accordance with the techniques presented herein.

Figure 4:
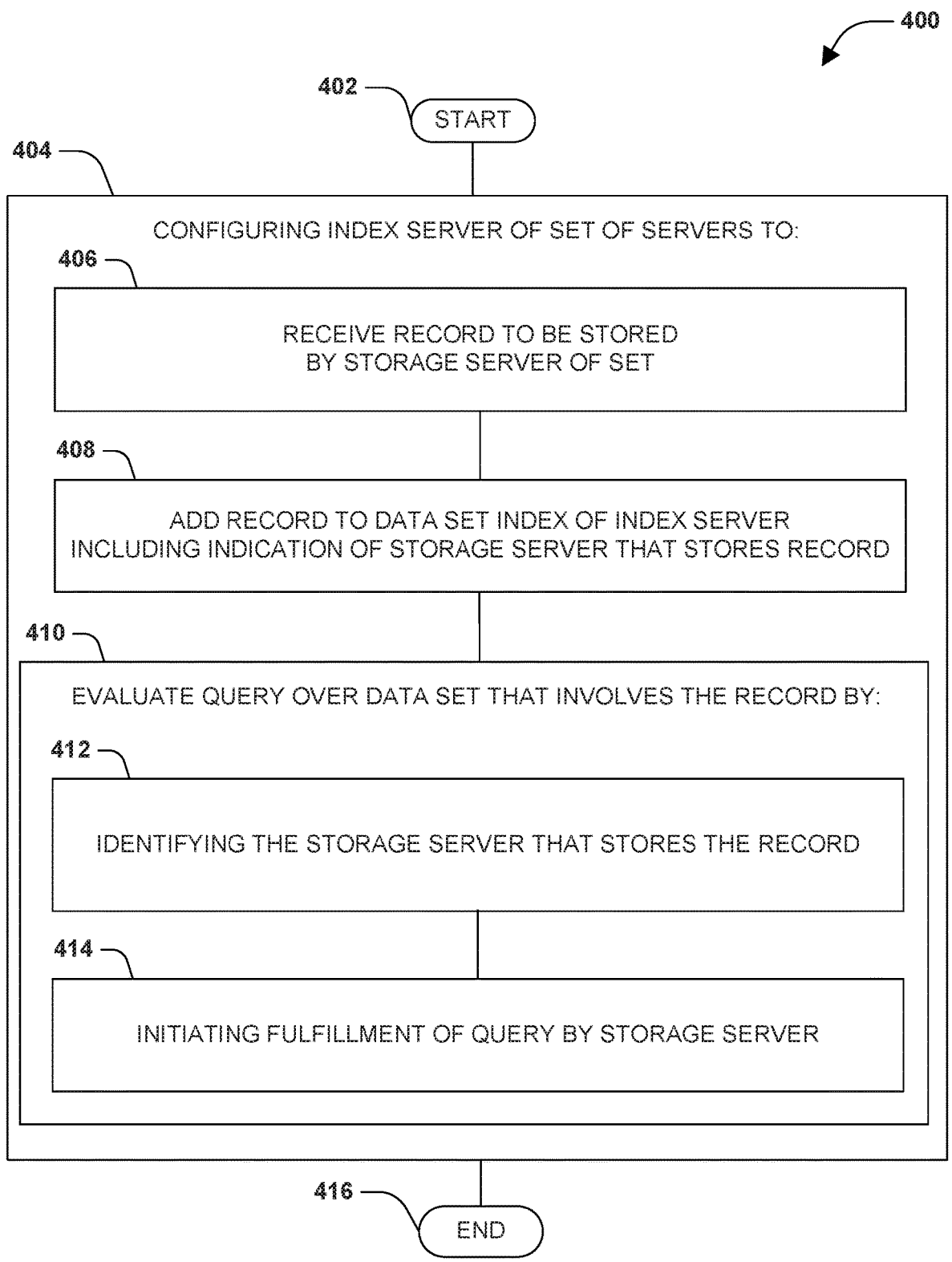
FIG. 4 is a flow diagram illustrating an exemplary method of storing a data set on a set of servers in accordance with the techniques presented herein.

FIG. 4 is an illustration of an example scenario featuring a third example embodiment of the techniques presented herein, wherein the example embodiment comprises an example method 400 of storing a data set 102 on a set 202 of servers 104 in accordance with techniques presented herein. The example method 400 involves one or more servers 104 comprising a processor 304, and may be implemented, e.g., as a set of instructions stored in a memory 306 of the server 104, such as firmware, system memory, a hard disk drive, a solid-state storage component, or a magnetic or optical medium, wherein the execution of the instructions by the processor 304 causes the server 104 to operate in accordance with the techniques presented herein.

The example method 400 begins at 402 and involves configuring 404 an index server 206 of the set 202 to receive 406 a record 112 to be stored by a storage server 210 of the set 202, and add 408 the record 112 to a data set index 114 of the index server 206, including an indication of the storage server 210 that stores the record 112. The example method 400 also involves configuring 404 the index server 206 to evaluate 410 a query 124 over the data set 202 that involves the record 112 by identifying 412, among the servers 104 of the set 202, the storage server 210 that stores the record 112, and initiating 414 a fulfillment of the query 124 by the storage server 210. In this manner, the example method 400 enables the set 202 to store and provide access to the data set 102 in accordance with the techniques presented herein, and so ends at 416.

Figure 5:
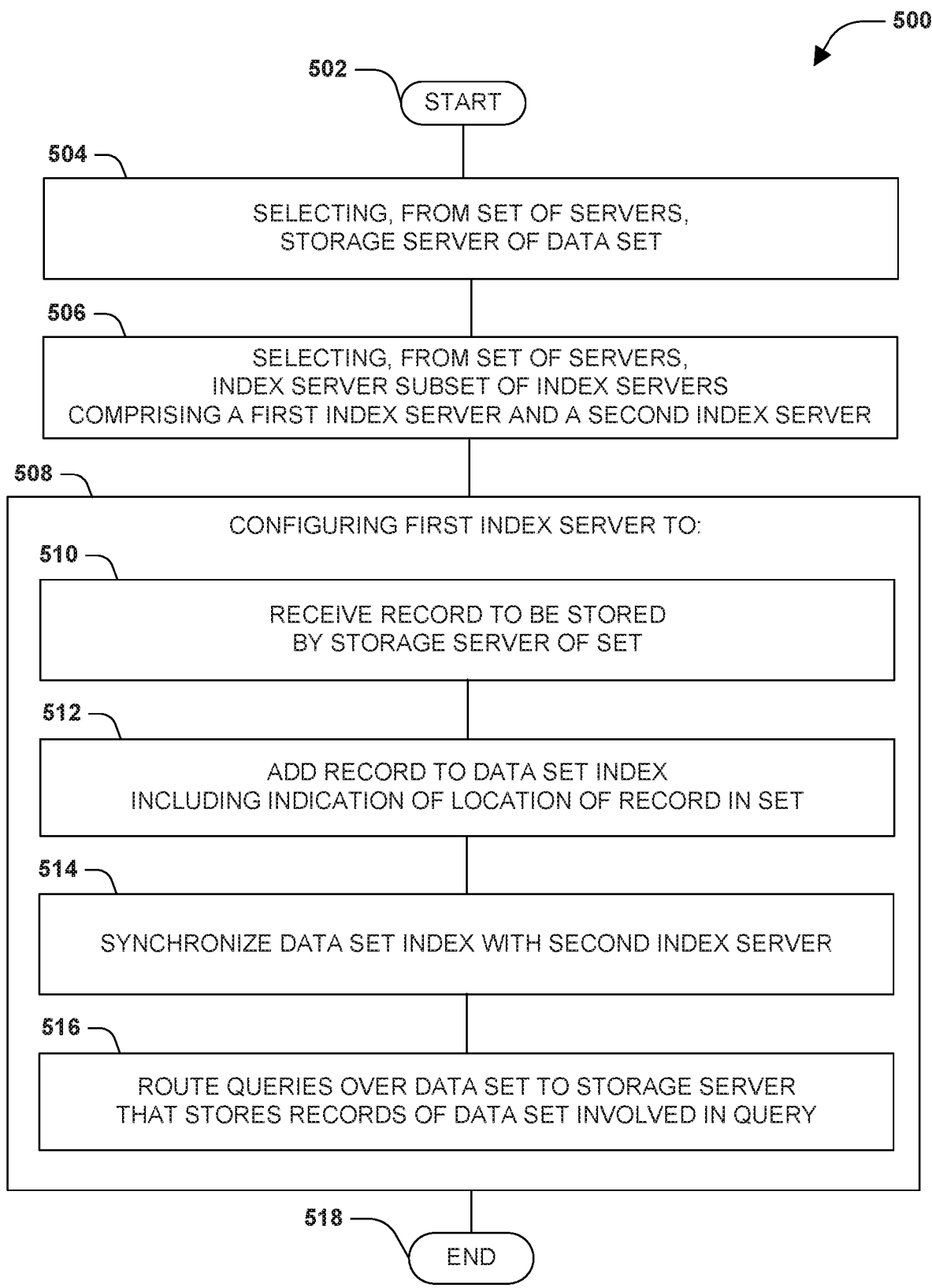
FIG. 5 is a flow diagram illustrating an exemplary method of configuring an index server to index a data set on a set of servers in accordance with the techniques presented herein.

FIG. 5 is an illustration of an example scenario featuring a fourth example embodiment of the techniques presented herein, wherein the example embodiment comprises an example method 500 of configuring a set 202 to provide access to a data set 102 in accordance with techniques presented herein. The example method 500 involves a set of servers 104 that respectively comprise a processor 304, and may be implemented, e.g., as a set of instructions stored in a memory 306 of one or more of the respective servers 104, such as firmware, system memory, a hard disk drive, a solid-state storage component, or a magnetic or optical medium, wherein the execution of the instructions by the processor 304 causes the server 104 to operate in accordance with the techniques presented herein.

The example method 500 begins at 502 and involves selecting 504, from the set 202, a storage server 206 of the data set 102. The example method 500 also involves selecting 506, from the set 202, an index server subset 204 of index servers 206 comprising a first index server 206 and a second index server 206, wherein the index server subset 204 excludes the storage server 206. The example method 500 also involves configuring 508 the first index server 206 to receive 510 a record 112 to be stored by a storage server 210 of the set 202. The example method 500 also involves configuring 508 the first index server 206 to add 512 the record 112 to a data set index 114 of the index server 206, including an indication of a location of the record 112 in the set 202. The example method 500 also involves configuring 508 the first index server 206 to synchronize 514 the data set index 114 with the second index server 206. The example method 500 also involves configuring 508 the first index server 206 to route 516 queries 124 over the data set 202 to the storage server 210 of the set 202 that stores records 112 of the data set 102 that are involved in the query 124. In this manner, the example method 500 enables the set 202 to store and provide access to the data set 102 in accordance with the techniques presented herein, and so ends at 518.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
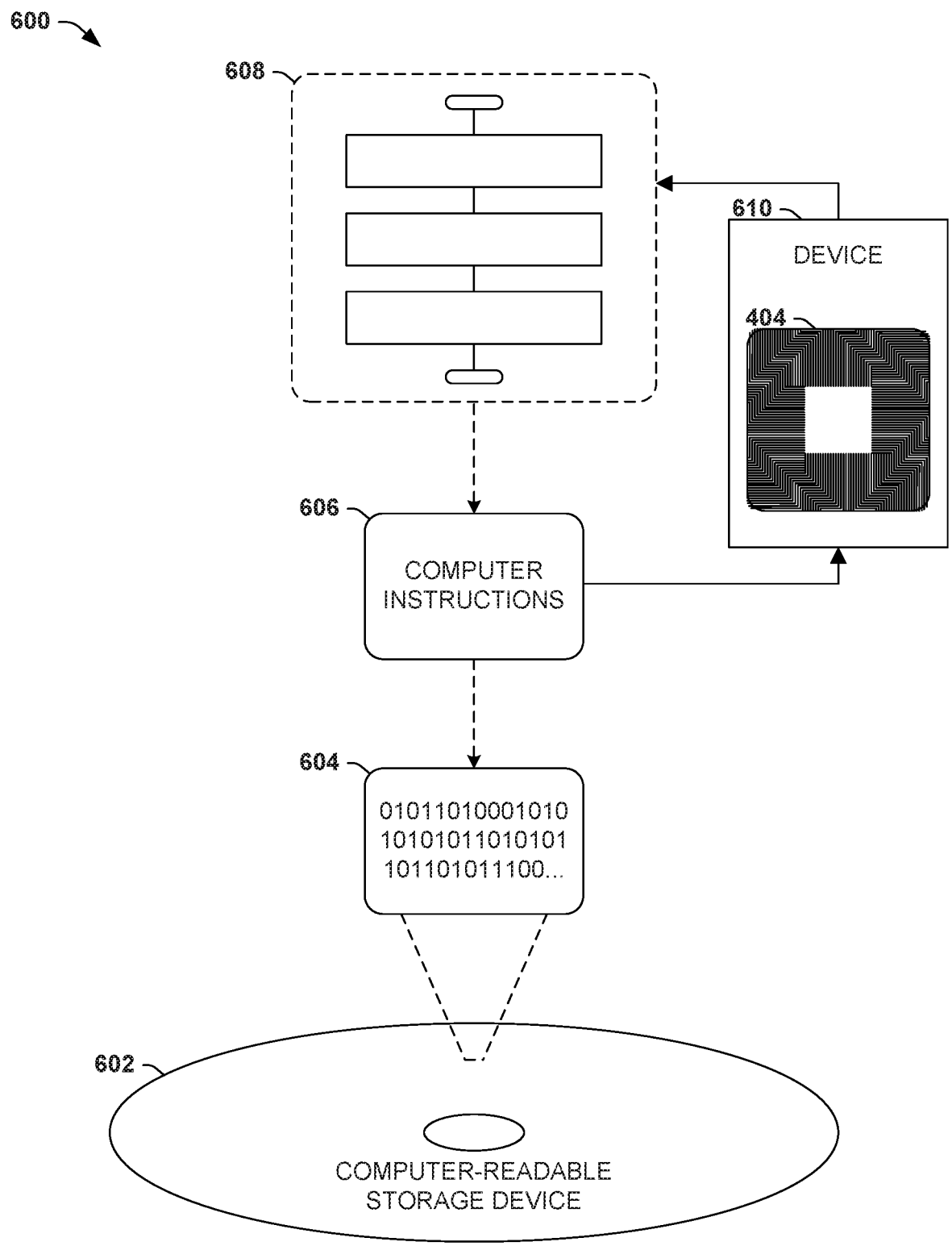
FIG. 6 is an illustration of an example computer-readable medium storing instructions that provide an embodiment of the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 304 of a server, cause the server to operate according to the principles set forth herein. For example, the processor-executable instructions 606 may encode components of a system that causes an index server 206 to provide access to a data set 202 to clients 122 in accordance with the techniques presented herein, such as the example system 308 of FIG. 3. As another example, the processor-executable instructions 606 may encode a method of configuring an index server 206 to provide access to a data set 102 that is stored by at least one storage server 210 of the set 202, such as the example method 400 of FIG. 4. As yet another example, the processor-executable instructions 606 may encode a method of configuring a set 202 of servers 104 to provide access to a data set 102, such as the example method 500 of FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example index server 302 and/or the example system 308 in the example scenario 300 of FIG. 3; the example method 400 of FIG. 4; the example method 500 of FIG. 5; and the example device 602 and/or example method 608 of FIG. 6) to confer individual and/or synergistic advantages upon such embodiments.

E1. Scenarios

A first aspect that may vary among implementations of these techniques relates to scenarios in which the presented techniques may be utilized.

As a second variation of this first aspect, the presented techniques may be utilized with a variety of servers 104, such as workstations, laptops, consoles, tablets, phones, portable media and/or game players, embedded systems, appliances, vehicles, and wearable devices. The server may also comprise a collection of server units, such as a collection of server processes executing on a device; a personal group of interoperating devices of a user; a local collection of server units comprising a computing cluster; and/or a geographically distributed collection of server units that span a region, including a global-scale distributed database. Such devices may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication). Additionally, such data sets 102 may be accessed by various clients 122, such as a client process on one or more of the servers 104 storing the data set 102; other servers 104 within a server cluster 118 that includes the data set 102; and/or various client devices that utilize the server 104 and/or server cluster 118 on behalf of one or more users and/or other devices. In some scenarios, the index servers 206 may share a first type of server 104 or server configuration, and the storage servers 210 may share a second type of server 104 or server configuration. In other such scenarios, the types of servers 104 may vary among the index server subset 204 and/or the storage server subset 208.

As a second variation of this first aspect, the presented techniques may be utilized with a variety of data sets 102 featuring a variety of data models, such as a relational database comprising tabular data organized into tables 110 comprising sets of attributes and sets of records 112 representing rows that present values for each attribute. Alternatively or additionally, the data set 102 may be modeled as graph data comprising a graph of nodes with interconnecting edges; as a set of key/value pairs of keys and associated values; and/or as a set of documents provided as structured or unstructured collections of entities. Such data sets 102 may also be used in a variety of circumstances, such as data warehousing; content provided through a content system such as a webserver; and object systems for an application or operating system. Some data sets 102 may comprise a hybrid of several data models, which may be aggregated in a horizontal manner (e.g., a collection of records 112 of which some records 112 are provided and/or requested in a first native item format, such as relational data, and other records 112 are provided and/or requested in a second native item format, such as entities within documents) and/or non-horizontal manner (e.g., a collection of records 112 in a first native item format, such as entities within documents, may be described by metadata represented by other records 112 provided in a second native item format, such as relational data).

As a third variation of this first aspect, the set 202 may be distributed in a variety of ways. As a first such example, the set 202 may comprise a set of servers 104 that are organized into server clusters 118, such as a group of servers 104 within a rack of a server room and/or within a particular building. In such scenarios, the index servers 206 may be located on one rack, in one room, and/or within one building, and the storage servers 210 may be located on a different rack, in a different room, and/or within a different building. As a second such example, the set 202 may comprise a set of servers 104 that are distributed over a region 212, such as an index server subset 204 that is located in one city of the region and a storage server subset 208 that is located in a different city of the region. As a third such example, the set 202 may comprise a set of servers 104 that are globally distributed, such as an index server subset 204 that is located in a first region and a storage server subset 208 that is located in a second region. As an alternative in any of these examples, the index servers 206 and storage servers 210 may be commingled in one or more such locations.

As a fourth variation of this first aspect, the presented techniques may be utilized with a variety of indexing techniques. In the example scenario 300 of FIG. 3, the indexing involves a hashtable 314, and the index server 302 indexes the records 112 of the data set 102 by invoking a hashing algorithm 318 with the record key 316 to calculate a hashcode 320, and then storing a reference 116 to the location of the record 112 in a location of the hashtable 314 that is associated with the hashcode 320 (e.g., modding the hashcode with an array length of the hashtable 314). Other indexing techniques may also be utilized, such as various forms of binary and/or fractal trees, bitmap indices, grids, maps, expert systems, and artificial neural networks. As a As a second example of this fourth variation, the references 116 stored by the data set index 114 of an index server 206 may indicate the location of the record 112 in a variety of ways, such as an indication of a server cluster 118 comprising one or more storage servers 210 that store one or more copies of the record 112; the particular storage servers 210 that store the record 112; and/or a memory address within the particular storage server 210 that stores the record 112. As another example, each storage server 210 may assign a local identifier of a record 112 upon storage, and the index 114 may indicate the local identifier of the record 112 within the selected storage server 210. As yet another example, the index 114 may indicate a plurality of locations where a particular record 112 is stored, such as shown in one of the example scenarios of FIG. 2, in which the indices 114 indicate, for each record 112, two storage servers 210 that redundantly store the record 112. As a still further example, a list of multiple locations for a record 112 may be specified and/or utilized as a collection of equivalent locations, and/or may be indicated with a relative priority, e.g., a first location of the record 112 and a backup location in case the first location is inaccessible.

As a fifth variation of this first aspect, the presented techniques may be utilized with queries 124 of many types. For example, the queries 124 may comprise relational queries in a language such as a variant of the Structured Query Language (SQL); graph queries that specify nodes and/or edges of a graph, such as GraphQL queries; key/value queries that request the values associated with a particular subset of keys, such as NoSQL queries; and/or document-oriented queries that request documents and/or entities thereof that meet certain criteria, such as Extensible Path Language (XPath) queries. Additionally, the queries 124 may be specified in a query format of an application language that is utilized by an application of the client 122, such as a JavaScript Query Language (JQL) query or a Language Integrated Query (LINQ) query. Many such scenarios may be identified in which the techniques presented herein may be advantageously utilized.

E2. Base Representation and Conversion

A second aspect that may vary among embodiments of the presented techniques involves a base representation in which the records 112 of the data set 102 may be indexed by an index server 206.

A variety of scenarios may motivate this selection. As a first such example, it may be desirable to index the records 112 of the data set 102 in a manner that is independent of a native format of a record 112, e.g., whether the native format of the records 112 is a row of a table in a relational database; a key/value pair in a key/value store; a node or edge in a graph; and/or an entity in a document of a document-oriented storage system. As a second such example, it may be desirable to index the records 112 of the data set 102 in a manner that is independent of a schema of the records 112, e.g., the semantic associations involved in logical relationships and/or constraints imposed upon the records 112 of the data set 102. As a third such example, it may be desirable to fulfill queries over the index of the records 112 in a variety of query formats, such as relational queries specified in a variant of the Structured Query Language (SQL); a graph-oriented query language, such as GraphQL; a document-oriented query language, such as XPath; and/or a query language associated with a language, such as a language-integrated query (LINQ) or a variant of JavaScript Query Language (JQL).

Such variety may be achieved by indexing the records 112 in a data set index 114 in a base representation that is independent of the native format of the records 112 and/or the schema exhibited by the data set 102. As a first variation of this second aspect, the base representation may comprise an atom-record-sequence representation of the records 112, where the atoms correspond to primitive values (e.g., Boolean values, integers, floating-point numbers, characters, and strings), optionally including a label, name, and/or type specifier; the records of the atom-record-sequence representation correspond to ordered collections of atoms, such as the members of an object; and the sequences correspond to arrays of records and/or atoms. In some scenarios, atoms may comprise records or sequences, which may enable nesting, such as where records encapsulate other records and/or sequences of records and/or atoms. In some scenarios, a hierarchical arrangement of atoms, records, and/or sequences may be consistently represented in and by the data layout; in other scenarios, atoms, records, and/or sequences may be distributed and interconnected by absolute or relative memory references. In some scenarios, relationships may be represented as identifiers and/or memory references stored in one sequence, record, and/or atom that respectively reference another sequence, record, and/or atom; in other scenarios, relationships may be represented separately from the data layout of the sequences, records, and/or atoms. In some scenarios, sequences, records, and/or atoms may be further annotated with values, such as an identifier or metadata describing various properties, such as the data source and/or native item format of a record 112. This limited collection of logical data types may be sufficient to reflect the fundamental logical organization of the items in the native item format, such as the basic contents and interrelationships of records in a relational database. Moreover, the atom-record-sequence arrangement of the data set may comprise an organizational structure, such as a tree representation, wherein storing the base representation of a record 112 in the data set further comprises appending the atom-record-sequence representation of the record 112 to a tree organization of base representations of the records 112 of the data set 102. When represented as a tree structure, the data set 102 may comprise a set of nodes that are arranged according to a schema of the data set (e.g., representing the hierarchical relationships, such as encapsulation within a record and/or ordering within an array), and a set of leaves that are respective appended to the nodes and that comprise instance values of the records 112 of the data set 102 (e.g., the atoms of the atom-record-sequence format).

Figure 7:
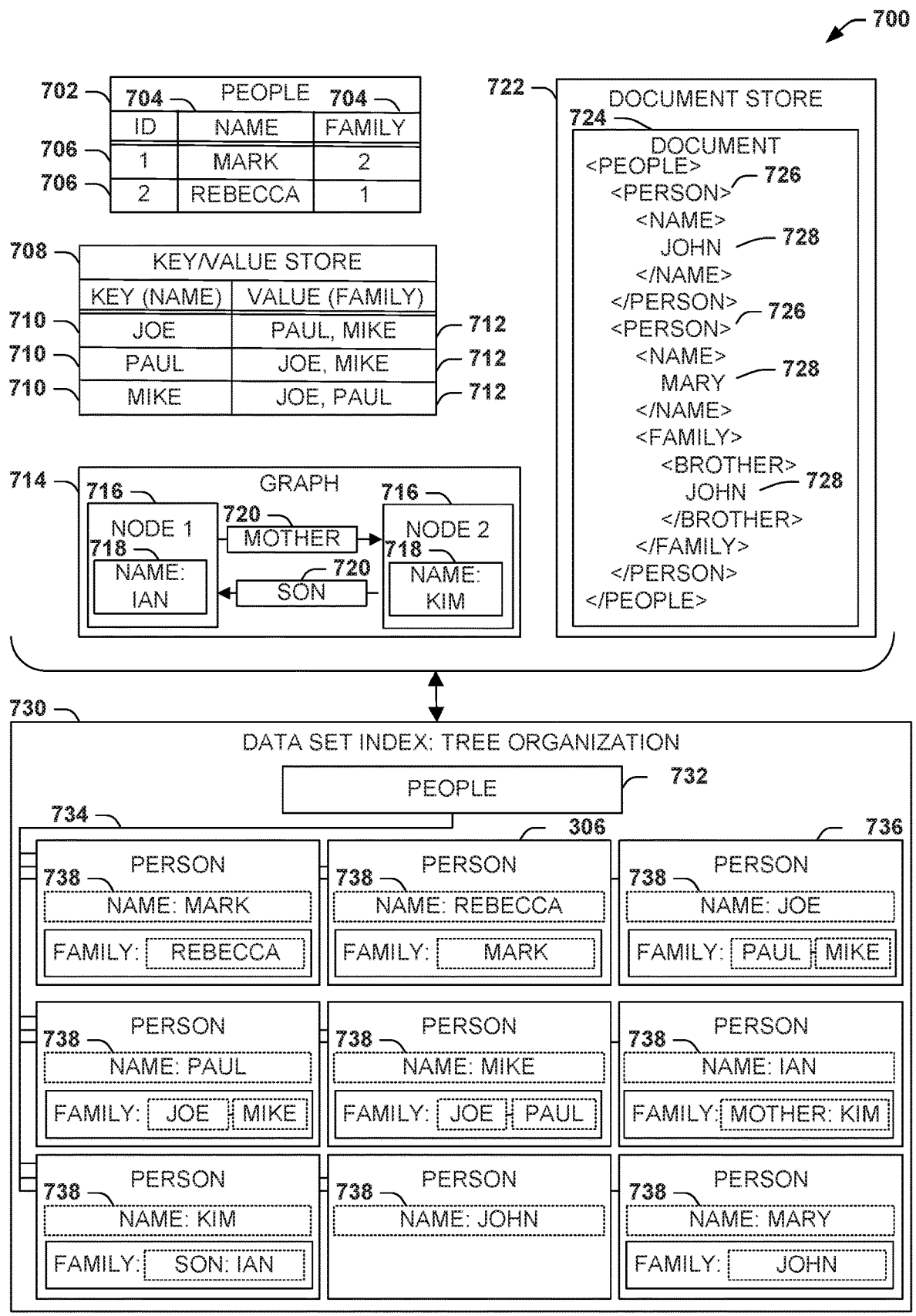
FIG. 7 is an illustration of a first example scenario featuring a data set index that is structured according to a base representation in accordance with the techniques presented herein.

FIG. 7 is an illustration of an example scenario 700 featuring a conversion of a variety of records 112, formatted according to various data models, into a data set index 114 structured as a tree organization 730 that serves as the base representation of all such records 112, irrespective of the native item format in which such records 112 are provided. In this example scenario 700, a first collection of records 112 is provided as a relational table 702 comprising a set of rows 706 and values for each attribute 704 of the table 702. A second set of records 112 is provided as a key/value store 708 comprising keys 710 that are associated with values 712. A third set of records 112 is provided as a graph 714 of nodes 716 that are interconnected by edges 720, and that include properties 718 in both the nodes 716 and edges 720. A fourth set of records 112 is provided as a document store 722 comprising a document 724 featuring a collection of entities, including a collection of nodes 726 providing a hierarchical structure and instance values 728 positioned within.

As further illustrated in the example scenario 700 of FIG. 7, although the records 112 of the different native item formats may share a common them, such records 112 may also exhibit some nuances and variations. As a first example, the edges 720 of the graph 714 may include a property 718 that indicates the nature of a familial relationship. As a second example, the people of the relational table 702 may be interrelated through a key reference attribute that stores an identifier of the related record. As a third example, the key/value store 708 may represent the familial relationships as an array that is packed into the value 712 associated with a key 710 representing the name. As a fourth example, the document store 722 may include an instance value 728 in a second node 726 indicating a familial relationship with the entity represented by the first node 726, but may omit, in the first node 726, a corresponding instance value 728 indicating a familial relationship with the entity represented by the second node 726. Such inconsistency may be accidental (e.g., the represented individual may have inadvertently skipped this entry) or deliberate (e.g., the represented individual may have chosen not to disclose familial relationships), but either way, the semantic value may be preserved in the base representation.

Despite the disparate data models and nuances exhibited by the native item formats of the records 112, a conversion of each record 112 into a base representation may unify the records 112 into a shared common format that preserves the semantic representations of each such record 112 in the data set index 114. The base representation may comprise a tree organization 730, beginning with a root node 732 comprising a "People" record 736. The "People" record 736 comprises a sequence 734 of records 736 that respectively represent the people provided in each set of records 112. Each record 736 includes a first atom 738 indicating the name of each person, and a second atom 738 that is also a record 736 representing familial relationships. In some such records 736, corresponding to the native item formats of the original records 112, the records 736 comprise an atom 738, such as the name or identifier of a related individual. In the instance of the missing familial relationship, the record 736 may simply omit the corresponding atom 738. For the key/value pairs of the key/value store 708 that specify familial relationships as an array, the atom 738 may comprise a record 736 that further comprises a sequence 734 of atoms 738.

In this manner, the tree organization 730 of the data set index 114 indexes the records 112 according to base representations that are logically equivalent with the native item format of each record 112, and irrespective of the data model represented by the native item format. Moreover, the atoms 738 (represented with broken lines) represent instance values 728 as the leaves of the tree organization 730, while the sequences 734 and records 736 represent the nodes 726 that provide the structural schema of the base representation. In some respects, additional choices may be made in the conversion of the representations that may preserve and/or discard some portions upon which logical equivalence is not dependent. For example, in the relational table 702, each row 706 further comprises an identifier value of an identifier attribute 704, and the logical relationships are specified in the key relation attribute 704 by referencing the identifier of the related row 706. Though omitted from the example scenario 700 of FIG. 7, the identifiers may be preserved in the base representation (e.g., by including atoms that include the identifier values). Alternatively, the conversion may recognize that the identifiers are merely the format-specific manner in which the relational table 702 represents relationships, and that the specific values are semantically immaterial as long as the so-represented relationships are preserved in the tree organization 730.

Figure 8:
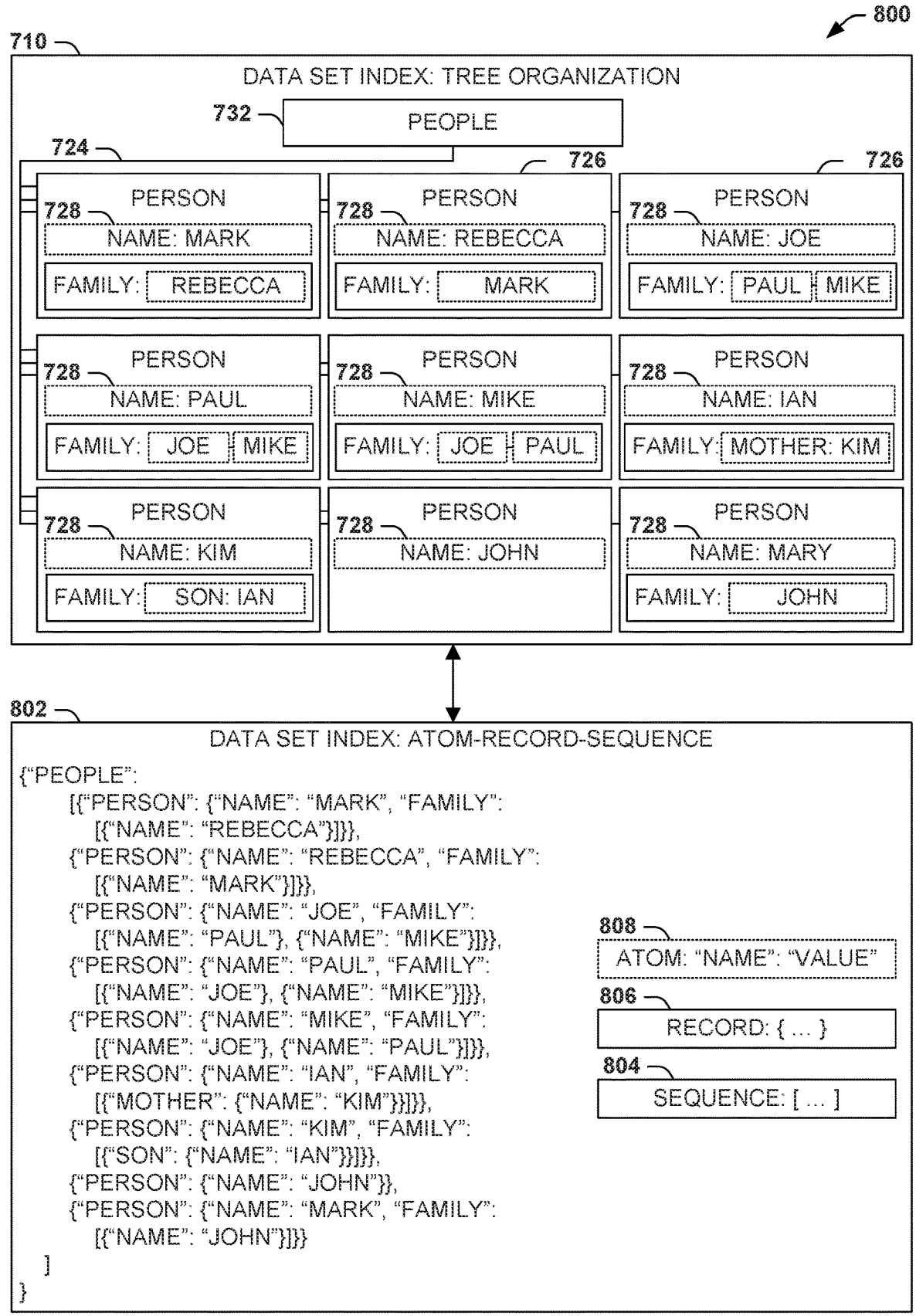
FIG. 8 is an illustration of a second example scenario featuring a data set index that is structured according to a base representation in accordance with the techniques presented herein.

FIG. 8 is an illustration of an example scenario 800 in which the tree organization 730 of the data set index 114 is further represented as an atom-record-sequence format 802. In this example scenario 800, atoms 738 are depicted in the atom-record-sequence format 802 as broken lines of values and labels; records 736 are depicted as curly brackets; and sequences 734 are depicted as square brackets. The atom-record-sequence format 802 embodies the structure and semantic properties of the tree organization 730, including the presentation of leaves that present instance values (e.g., as atoms 738) and nodes that provide the structure of the schema of the records 112. The base representation further preserves and unifies the semantic content of the records 112 of the disparate item sets, irrespective of the native item formats of each record 112.

It may be further appreciated from the comparison of FIGS. 7-8 that the base representation exhibited by the tree organization 730 and the atom-record-sequence format 802 may be reversed, such that any selected record 112 of the data set 102 302 may be provided, in response to a query 124 specifying a requested format, by converting the base representation of the record 112 into the requested format. For example, after the "Mary" and "John" records 112 that are originally provided as entities of the document store 722 are converted into the base representation and stored in the data set index 114, a query 124 may be received that requests a selection of records 112 in a different requested format—e.g., as rows 706 of a relational table 702, as key/value pairs of a key/value store 708, or as interconnected nodes 716 of a graph 714. Such a query 124 may be fulfilled by applying the reverse process, in view of the requested format. For instance, a relational table 702 may be generated that converts the base representations of the requested records 112 into rows 706. Moreover, the query 124 specifying the requested format may further indicate details of the conversion that address any discrepancies between the native item format and the requested format. For example, in the context of the missing familial relationship of the "John" entity, the query 124 may specify whether the converted relational table 702 is to include a "family" attribute 704 with a null value for this entity, or whether the converted relational table 702 is to omit a "family" attribute 704 and instead provide a second relational table 702 that provides the familial relations, which includes a row 706 relating "Mary" to "John" but does not include a row 706 relating "John" to "Mary." In this manner, the semantic content of the records 112 is preserved in the base representation of the data set index 114, and discrepancies may be resolved a part of the query 124.

The conversion of records 112 into the base representation may include a variety of other techniques. As a first such example, for a record 112 further comprising an array of at least two values, the conversion of the record 112 into the base representation may involve generating an array container node, and for each value of the array, appending, to the array container node, a child node for the value. In some such scenarios, the appending may include appending, to the array container node, a child node comprising an array index of the value; and appending, to the child node, a grandchild node comprising the value. That is, between the array container node and the node for the item contained at an array index, a tree organization 730 may insert an additional node that specifies the array index. Such insertion may preserve the array order of the records 112 in the native item format and/or may facilitate lookup. As a second such example, where a record 112 further comprises a key/value pair, the conversion of the record 112 into the base representation may further comprise appending, to a selected node of the tree organization, a child node comprising a key of the key/value pair; and appending, to the child node, a grandchild node comprising a value of the key/value pair. That is, the leaf representing the value 712 may depend from a node representing the key 710. Alternatively, the key and node may be included together in a node, such as the label and value combinations depicted in the example scenario 700 of FIG. 7.

The indexing of records 112 using a base representation, such as illustrated in the example scenarios 700, 800 of FIGS. 7-8, may provide a variety of potential technical advantages.

As a first such example, the index servers 206 of the index server subset 204 may store records 112 in the data set indices 114 irrespective of the native format in which the records 112 are received, including a data set 102 comprising records 112 that are originally received in a variety of different native formats.

As a second such example, the index servers 206 of the index server subset 204 may store records 112 in the data set indices 114 irrespective of the format in which the records 112 are stored by the storage servers 210, including a storage server subset 208 that stores records 112 in a variety of formats. Moreover, the formats of one or more storage servers 210 may change over time (e.g., converting a key/value store into a relational database) and/or conflict (e.g., the format of records 112 stored by a first storage server 210 may differ from the format of records 112 stored by a second storage server 210), but the indexing of such records 112 by the index servers 206 in a base representation format may remain consistent and invariant despite such changes.

As a third such example, the indexing of records 112 in a base representation format may enable the index servers 206 to index the records 112 irrespective of a schema imposed upon the records 112, such as the particular semantics of the logical interrelationships of tables in a relational database. By reducing the records 112 to a base representation format that reflects only basic structure (e.g., encapsulation and/or sequencing), the index servers 206 may accurately index the records 112 in the data set index 114 irrespective of any schema imposed upon such records 112 by an application. Moreover, the indexing may occur irrespective of schema versions and/or changes (e.g., indexing, together, a first set of records 112 that are received from a first region 212 using a first schema and a second set of records 112 that are received from a second region 212 using a second schema).

As a fourth such example, the indexing of records 112 in a base representation format may enable the index servers 206 to receive and evaluate queries 124 over the indexed records 112 in a variety of query formats, and/or queries 124 that request the records 112 in a variety of requested formats.

As a fifth such example, the indexing of records 112 in a base representation may dissociate a layout of the data set index 114 used by the index server 206 from a layout of the records 112 stored by a storage server 210. That is, the data set 102 may be is organized by one or more storage servers 210 according to a data set layout, such as a row-oriented or column-oriented relational database; a graph; and a key/value store, such as a hashtable. The data set index 114 may be organized by one or more index servers 206 according to an index data layout that is independent of the data set layout, such as a tree index; a columnar index; and an inverted index. That is, the index data layout may be selected in view of the properties of the data set index 114 and/or the index server 206, and irrespective of the data layout of the records by the storage server 210, even if different storage servers 210 utilize different layouts. Many such variations may be enabled by the base representations of the records 112 in accordance with the techniques presented herein.

E3. Server Set Architectures

A third aspect that may vary among embodiments of the techniques presented herein involve the architecture of the set 202, including the relationship between the index servers 206 and the storage servers 210.

As a first variation of this third aspect, the index server subset 204 may be organized in a variety of ways. As a first such example, the index server subset 204 may comprise a set of replicas, wherein each index server 206 stores an identical copy of the data set index 114. Such architectures may configure the index servers 206 to operate as replicas, e.g., configuring a second index server 206 to maintain a current version of the data set index 114 but remain available as a substitute in the event of a failure of another index server 206. Alternatively, the data set index 114 may be distributed over the index server subset 204, such that a first index server 206 stores a first portion of the data set index 114 and a second index server 206 stores a second portion of the data set index 114. Such distribution may occur in a variety of ways; e.g., each index server 206 may store the records 112 that are stored by a particular subset of storage servers 210, and/or records 112 of certain types (e.g., partitioning the data set index 114 based upon the first digit of a randomly assigned identifier of the records 112, or based upon the client with which each record 112 is associated in a multitenancy scenario). Hybrid architectures may involve a partitioning of the index server subset 204 into subsets of index servers 206 that operate as replicas, or where a first index server 206 stores replicas of two or more portions of the data set index 114 that are respectively stored by a second index server 206 and a third index server 206. As a second such example, the components of the index servers 206 of the index server subset 204 may vary. For example, the index servers 302 may store the data set index 114 in a memory 306 such as a solid-state storage device in order to facilitate the fulfillment of index inquiries over the data set 102. Other architectures may also be utilized; e.g., an index server 302 may store at least a portion of the data set index 114 in system RAM, either as a volatile store for the data set index 114 or as a performance-facilitating cache for a nonvolatile store for the data set index 114.

As a second variation of this third aspect, the index servers 206 of the index server subset 204 may coordinate the distribution of updates in a variety of ways. As a first such example, the index servers 206 may synchronize the data set indices 114 on a schedule (e.g., at a particular time of day or after a particular interval since the previous synchronization). Alternatively, the index servers 206 may synchronize the data set indices 114 in response to updates to the data set index 114. As a second such example, the index servers 206 may update the data set index 114 for all updates applied to the data set 102 by the storage servers 210. In one such embodiment, all updates are originally provided to one or more index servers 206 of the index server subset 204, which update the data set index 114 and forward the updates to one or more storage servers 210 to update the data set 102. In another such embodiment, updates are concurrently provided by a common source to the index server subset 204 (to update the data set index 114) and to the storage server subset 208 (to update the data set 102). In yet another scenario, updates are first applied to the data set 102 by the storage server subset 208, and then forwarded to the index server subset 204 to update the data set index 114. Alternatively, the index servers 206 may selectively update the data set index 114, e.g., by indexing only certain updates, such as records 112 that are anticipated to be frequently accessed or of high priority.

As a third variation of this third aspect, updates to the data set 102 may be added to the data set index 114 and propagated among the index servers 206 of the index server subset 204 in a variety of ways. As a first such example, an update may arrive at an index server 206 that incorporates the update and that distributes the update and/or modifications of the data set index 114 to other index servers 206 of the index server subset 204 that store the affected records (e.g., a diff of the data set index 114). In some scenarios, the index server 206 may comprise a designated intake point for notifications of updates to the data set 102, and an update that is received by another index server 206 and/or storage server 210 may forward the update to the index server 206 serving as the designated intake point, which may apply the update to the local copy of the data set index 114 and then redistribute the update to the other index servers 206 of the index server subset 204. In other scenarios, the index servers 206 may be organized as peers, such that each replica may initially receive and apply updates to the data set index 114 and then synchronize such updates with the other index servers 206 of the index server subset 204. As a second such example, the synchronization of updates to the data set index 114 may be coordinated with the application of the updates to the data set 102; e.g., if an update, such as a new record 112, is first received by the index server subset 204, the index servers 206 may wait until the update to the data set index 114 is propagated to all or some of the index servers 206 before forwarding the update to the storage server subset 208. In one such scenario, the update may be held until one or more index servers 206 that are physically proximate to the storage servers 210 that store the update, and/or one or more index servers 206 through which the record 112 is likely to be requested, confirm the updating of the data set index 114 prior to forwarding the update to the storage server subset 208.

As a fourth variation of this third aspect, the set 202 may fulfill queries 124 for records 112 of the data set 202 in a variety of ways. As a first such example, a query 124 may be initially received by an index server 206 that identifies the records 112 involved in the inquiry, and then forwards the query 124 to a selected storage server 210 that stores the identified records 112 and/or informs a client 122 that submitted the query 124 of the selected storage server 210, such that the client 122 may transmit the query 124 to the selected storage server 210. As a second such example, a query 124 may initially be provided to a storage server 210 that consults one or more index servers 206 to determine the location of the records 112 involved in the query. If the storage server 210 that received the query 124 is storing at least some of the records 112 involved in the query 124, the storage server 210 may fulfill at least a portion of the query 124 without consulting the index server subset 204 of the locations of such locally stored records 112. As a third such example, a query 124 may be processed by a different component (e.g., a dedicated or selected query processor of the set 202 and/or a device of the client 122) by initially consulting the index server subset 204 to identify the locations of the records 112 involved in the query 124, and then awaiting a query result from a storage server 210 storing such records 112 and to which an index server 206 forwarded the query 124 and/or directly retransmitting the query 124 to such identified storage servers 210. In such scenarios, the tasks of query processing and identification of the records 112 involved in the query 124 may be performed, in whole or in part, by one or more index servers 206; one or more storage servers 210; and/or other devices, such as a device of the client 122. Many such architectural variations may be selected for embodiments of the techniques presented herein.

E4. Server Set Location Selection

A fourth aspect that may vary among embodiments of the techniques presented herein involves the distribution of the set 202. As demonstrated in FIG. 2), the decoupling of the index servers 206 and the storage servers 210, as compared with tightly coupled architectures, may enable a range of new architectural options for the distribution of the set 202.

As a first variation of this fourth aspect, index servers 206 may be located in different regions 212, including regions 212 that are different than the locations of the storage servers 210 that store the records 112 that are indexed by the index servers 206. Additionally, the locations of the index servers 206 may be selected relative to the locations of other index servers 206 of the index server subset 204. For example, with respect to a first index server 206, the index server subset 204 may comprise a set of replicas that include one or more of: a local index replica that is collocated with the first index server 206 (e.g., a replica that is located in the same rack or building as the first index server 206); a first regional index replica that is also located within the first region 212, but that is not collocated with the first index server 206 (e.g., a replica that is located in a different area of the same region 212 as the first index server 206); and a second regional index replica that is located within a second region 212 that is different than the first region 212 in which the first index server 206 is located.

As a second variation of this fourth aspect, a variety of considerations may motivate the selection of a particular distribution of the index server subset 204.

As a first example of this second variation, different index servers 206 that comprise replicas of at least a portion of the data set index 114 may be positioned in different fault domains to promote resiliency of the index set 202 in response to a fault. A fault domain may be defined as a collection of servers 104 that are likely to fail together, such as a rack, a building, or a localized region 212 that may be subjected to fire, flood, theft, or network outage. Accordingly, a first index server 206 may be located in a first fault domain of the set 202, and at least one index replica of the set 202 may be located in a second, different fault domain than the fault domain of the first index server 206. The other servers 104 of the set may failover to using the first index server 206 if the second fault domain experiences a fault, and/or may failover to using the second index server 206 if the first fault domain experiences a fault. In some such scenarios, fault domains may be defined as a hierarchy, such that other servers 104 utilizing a highest-priority first index server 206 in a fault domain that experiences a fault may initiate failover to a predefined next-highest-priority second index server 206 in a different fault domain. In some scenarios, index servers 206 may be designated in different roles and/or priorities; e.g., some index servers 206 may be identified as primary index servers 206 that typically provide the indexing capabilities of the data set 102 and that bidirectionally synchronize the data set index 114, while other index servers 206 may be identified as secondary index servers 206 that unidirectionally synchronize the data set 102 from the primary index servers 206, and that stand ready for failover in case of a fault of one or more primary index servers 206.

As a second example of this second variation, different index servers 206 that comprise replicas of at least a portion of the data set index 114 may be positioned in different regions 212 based at least in part upon promoting a proximity of each index servers 206 and the location of forecasted demand for indexing. As a first example, a particular storage server 210 may store data in a particular location that is anticipated and/or detected to be in high demand, and it may be advantageous to locate or relocate one or more index servers 206 to a proximity near the location of the storage server 210 to promote performance. As a second example, a population of clients 122 in a particular location may be anticipated and/or detected to initiate a large number of queries 124 across the data set 102 (potentially including storage servers 210 across a number of regions or even the entire globe), and it may be advantageous to locate or relocate one or more index servers 206 to a proximity near the source of the queries 124 to promote performance.

As a third example of this second variation, the locations of index servers 206 may be selected based upon resource availability, such as locations where unprovisioned servers 104 are plentiful and/or idle; where network capacity and power are plentiful and/or economical; and/or where security over the index servers 206 is reliable and/or adequate for the data indexed thereby. As a first such example, regional regulations may also be taken into consideration; e.g., some data sets 102 are to be restricted to a particular region 212, and it may be convenient and/or compulsory to store an index server 206 of the data set 102 in the particular region 212. As a second such example, a multitenant distributed database may involve a first set of records 112 of a first client 122 that are stored by a first storage server 210 and a second set of records 112 of a second client 122 that are stored by a second storage server 210, wherein mutual confidentiality (e.g., protection of each client's records from the other client, e.g., due to trade-secret or proprietary information considerations) may be applied. It may be desirable to generate a data set index 114 that covers all such records 112; however, each storage server 210 may be collocated with one or more clients 122, and locating such a data set index 114 within the purview of either client 122 may be undesirable. Instead, the data set index 114 may be stored only in a region 212 that is distant from and outside the purview of both clients 122, such that security may be maintained over the data index server 206.

As a fourth example of this second variation, the numbers, locations, configurations, and/or relationships of the index servers 206 and the storage servers 210 of the set 202 may affect the performance characteristics of the set 202.

As a first such example, increasing a number of replicas of index servers 210 may increase concurrency and scalability (e.g., enabling many index servers 210 to perform and fulfill queries that involve identifying the locations of records 112 of the data set 102 to be read), decrease latency for read indexing (e.g., by expanding capacity and potentially proximity of an index server 210 to the client 122 initiating the query 124, and/or resiliency (e.g., recovery from the loss of an index server 210 or even an entire fault domain may be expedited due to the preestablished availability of more replicas), but may also increase the latency of updating the data set index 114 (e.g., because the update may have to be verified as committed over a large population of index servers 206 prior to reporting a successful commit of the write to the data set 102). Conversely, decreasing the number of replicas of index servers 210 may reduce the latency of updating the data set index 114, but at the expense of increased read latency, reducing concurrency and scalability, and/or reducing resiliency during fault recovery.

As a second such example, the granularity of index servers 206 with respect to the portions of the data set index 114 (e.g., partitioning the data set index 114 in variously sized increments over the index servers 206 vs. organizing such index servers 206 as replicas that store identical copies of the data set index 114) may affect various performance characteristics. For instance, adding or provisioning index servers 206 as replicas may promote fault recovery and concurrency, but may reduce the adaptability of the index server subset 204 to changes in the data set index 114 (e.g., adjusting the partitioning of the data set index 114 over the replicas, such as with a different layout). Alternatively, adding or provisioning index servers 206 as partitions of the data set index 114 may promote adaptability (e.g., further partitioning the data set index 114 may only involve one or a few index servers 206 that already store the particular partition), but at the expense of resiliency (e.g., due to the unavailability of replicas that store the same portion of the data set index 114).

As a third such example, the geographic distribution of index servers 206 may affect performance characteristics. For example, index servers 206 may be deployed within a large number of regions 212, or broadly within a region 212; alternatively, the index servers 206 may be centralized within a region 212 and/or to a smaller number of regions 212. Such options in the distribution of the index servers 206 may affect performance characteristics of the data set 102. For example, choosing a finer granularity (e.g., distributing more index servers 206 in a broader manner) may promote access and performance of the data set 102, since clients 122 are likely to be nearer to an index server 206. However, choosing a coarser granularity (e.g., a centralized location for index servers 206 in a smaller number of regions) may promote security, but at the expense of a greater impact from a fault within a fault domain that contains a concentration index servers 206 and potential latency of both reading and writing (e.g., a greater distance between any particular client 122 and the closest index server 206 that is capable of fulfilling queries 124 of the client 122). Other properties of geographic distribution may vary; e.g., a first location for an index server 206 may offer greater responsiveness, security, and/or bandwidth, but may also be available on a more limited basis and/or at a higher cost as compared with a second location of the index server 206 that offers poorer performance with larger and/or more affordable availability.

In view of such factors, in some scenarios, the locations and distribution of the index servers 206 and/or storage servers 210 may be selected in a manner that generally provides an appealing combination of performance characteristics for any application, based upon estimates and/or measurements of the resulting performance characteristics achievable thereby.

In other scenarios, the estimates and/or measurements of relevant performance characteristics may be compared with the performance characteristics upon which a particular application depends, such as its sensitivity and/or tolerance for read latency, update latency, concurrency, scalability, adaptability, resiliency to faults, security, availability, and/or costs. For example, a first application may involve a large number of reads from clients 122 around the world over a comparatively static data set 102 that is rarely updated, wherein read latency is likely to be quite apparent to clients 122, but update latency is not likely to be a significant factor. For this first application, it may be desirable to choose a distribution of the index server subset 204 with a comparatively large number of index servers 206 and a relatively large geographic distribution that promotes proximity of a client 122 in any location of the world to a nearby index server 206. A second application may involve a large number of reads and updates to the data set 102 that are anticipated from a small number of regions 212, wherein updates to the data set 102 are desirably implemented quickly and with a low risk of data loss. For this second application, it may be desirable to choose a distribution of the index server subset 204 with a comparatively small number of index servers 206 (in order to maintain a low update latency) positioned in a first fault domain that is different than a second fault domain in which the storage servers 210 are located, and optionally including secondary index servers 206 as replicas located in a third fault domain that unidirectionally synchronize the data set index 114 stored by the primary index servers 206, e.g., in order to promote fault recovery, including the failure of the entire fault domain containing the primary index servers 206.

In some such scenarios, an offer to host an application may involve an offer of a guarantee to provide a data set 102 that is capable of satisfying a particular set of performance characteristics for the application. For example, the first application may specify, as significant performance characteristics, a low read latency for reads from the data set 102 initiated by clients 122 in any region 212; while a second application may specify, as significant performance characteristics, a low update latency of updates to the data set 102 initiated by clients 122 in a selected number of targeted regions 212. The offer to host each application may be contingent on a selection of a distribution of index servers 206 that is estimated and/or measured as capable of satisfying the guarantee for the application. In some cases, such guarantee may be offered with a selected cost based on the resource costs of the distribution of provisioned servers of the set 202. Alternatively or additionally, an application may be offered a range of guarantees of various performance characteristics based upon various options for the distribution of the set 202. For example, a first offer of hosting a data set 102 for an application may include a guarantee of low-latency reads that are below ten milliseconds for 90% of read requests initiated in a particular region 212, which may be achievable by a particular distribution of the set 202 (e.g., an index server subset 204 that is collocated with and/or proximate to the storage server subset 208 and/or the clients 122), but where the proximity and/or limited availability of servers in the selected locations entail a higher resource cost. A second offer of hosting the same data set 102 for the same application may include a less performant guarantee of read latency based upon a distribution of index servers 206 in a more distant region, wherein the distribution exhibits a marginally higher read latency but also entails greater availability of server and/or a lower resource cost.

As a third variation of this fourth aspect, for a selected distribution of the index server subset 204, the index servers 206 may be configured in view of the distribution, including a proximity to the storage servers 210.

As a first example of this third variation, an index server 206 may utilize different synchronization schedules for synchronizing updates to the data set index 114 with various other index servers 206, where the particular synchronization schedule is selected based at least in part on a proximity and/or distance between the index servers 206. For example, an index server 206 may synchronize the data set index 114 with a local index replica according to a first synchronization schedule, and may synchronize the data set index 114 with a regional index replica according to a second synchronization schedule that is different than the first synchronization schedule. In some scenarios, the first synchronization schedule may be of higher frequency and/or priority than the second synchronization schedule (e.g., to ensure rapid propagation of updates within a local region 212, and eventual propagation of the updates to more distant regions 212). In other scenarios, the second synchronization schedule may be of higher frequency and/or priority than the first synchronization schedule (e.g., to prioritize the propagation of updates to the data set index 114 between different fault domains, and to achieve local propagation to replicas to promote scalability on a more relaxed schedule). The selection of synchronization schedules may be selected based on the performance characteristics of an application of the data set 102 (e.g., the sensitivity of the application and/or data set 102 to read latency, update latency, resiliency for fault recovery, and/or timely distribution of updates for cross-regional consistency).

As a second example of this third variation, a particular storage server 210 may be predicted and/or measured as a source of demand for one or more records 112 stored by the storage server 210. While updates to such records 112 may arrive at any index server 210, the storage server 210 may be identified as closer to a second index server 206 than a first index server 206. Therefore, the first index server 206 may synchronizes updates to the data set index 114 with the second index server 206 using a synchronization schedule that is proportional to a predicted demand of the records 112 from the storage server 210, particularly relative to the synchronization schedules between the first index server 206 and other index servers 206 of the index server subset 204. For example, if the location of the second index server 206 is anticipated to be a primary source of demand for the records 112 of the storage server 210, the second index server 206 may be identified as a primary source of indexing for the records 112, and the first index server 206 may propagate updates of the data set index 114 to the second index server 206 on a high-frequency synchronization schedule. Conversely, if the second index server 206 is located in a region 212 where demand for the records is likely to be low, the first index server 206 may propagate updates of the data set index 114 to the second index server 206 on a comparatively low-frequency synchronization schedule.

Figure 9:
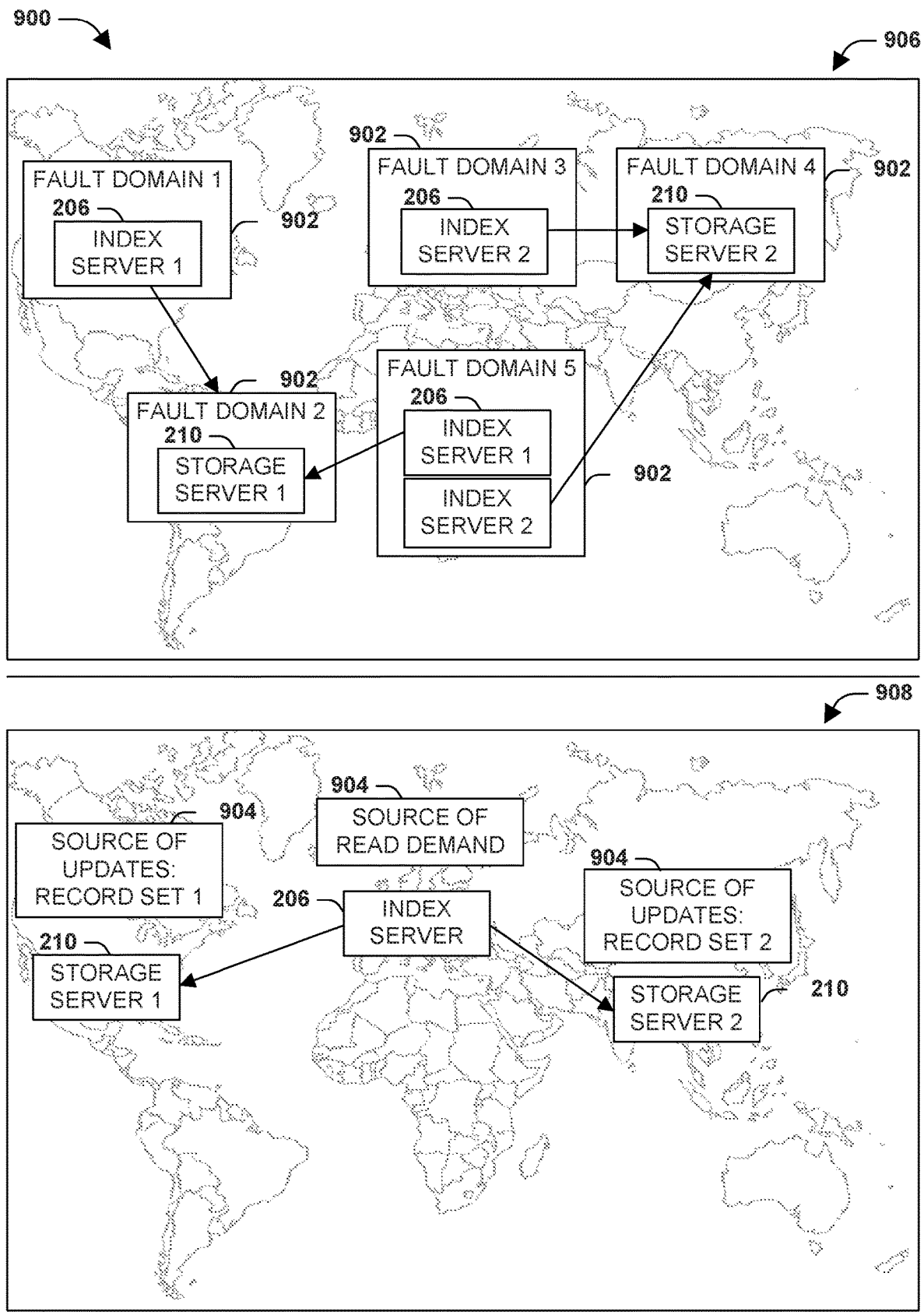
FIG. 9 is an illustration of an example scenario featuring a selection of a distribution of an index server subset for a data set serving an application in accordance with the techniques presented herein.

FIG. 9 is an illustration of a set 900 of example scenarios in which the distribution of the index server subset 204 may be selected in view of various properties of the data set 102 and the distribution of the storage server subset 208.

In a first example scenario 906, the index servers 206 may be distributed in fault domains 902 to promote recovery from faults. For example, different regions 212 of the world may be selected as fault domains 902 for a cluster of index servers 206 and/or a cluster of storage servers 210. A failure of any fault domain 902 may be recovered through techniques such as failover (e.g., the first index server 206 is stored in a first fault domain 902 and a replica is stored in a fifth fault domain 902). Fault recovery may also be facilitated by the distribution of index servers 206 and storage servers 210, wherein a failure of a particular fault domain 902 may enable a rapid reconstruction of data and/or at least an identification of lost data based on the servers 104 in other fault domains 902. For example, if the first fault domain 902 comprising the first index server 206 fails, a substitute index server 206 may be provisioned; while the replica in the fifth fault domain 902 temporarily fulfills demand for the first index server 206 by serving as a failover, the contents of the storage server 210 may be reindexed to rebuild the data set index 114 on the newly provisioned index server 206. Alternatively, if the second fault domain 902 comprising the first storage server 210 fails, at least the data that was stored on the first storage server 210 may be rapidly identified by the first index server 206 in the first fault domain 902 to initiate a recovery and/or rebuilding process. In this manner, the distribution of the set 202 using fault domains 902 may promote the resiliency of the set 202 in response to failures.

In a second example scenario 908, the distribution of index servers 206 and/or storage servers 210 may be selected based upon anticipated or measured sources 904 of demand for such services. As a first such example, likely sources 904 of updates to the records 112 comprising the data set 102 may be identified, e.g., in two regions 212 of the world, and storage servers 210 may be provided in those regions 212. However, a different source 904 of read demand for the records may be identified in a third region 212 of the world, and an index server 206 may be located near the source of the read demand, even if the index server 206 index the records 112 that are remotely stored by the storage servers 210 in the first region 212 and the second region 212. In this manner, the distribution of servers 104 may be selected to serve the anticipated sources 904 of demand, and in particular to reduce read and update latency of the data set 202 by decoupling the locations of the index server 206 and the storage servers 210 respectively. Many such techniques may be utilized to choose a distribution of the index server subset 204, and the distribution of the data set index 114 over the index server subset 204, in accordance with the techniques presented herein.

E5. Index Server Subset Redistribution

A fifth aspect that may vary among embodiments of the techniques presented herein involves the adaptation of the architecture of the index server subset 204 and/or the data set index 114, including the number, distribution, locations, partitioning, and/or roles of the index servers 206 of the index server subset 204, as well as the reconfiguration of individual index servers 206 to adapt to alterations of the architecture of the index server subset 204.

As a first variation of this fifth aspect, a variety of circumstances may prompt a reevaluation of the selected distribution of the index server subset 204. As a first such example, the index server subset 204 may be adapted by adding and/or removing index servers 206. An individual index server 206 may be reconfigured, responsive to an addition of a new index replica to the index server subset 204, to synchronize the data set index 114 with the new index replica; and/or may be reconfigured, responsive to a removal of a second index server 206 from the index server subset 204, to refrain from synchronizing the data set index 114 with the second index server 206.

As a second such example, the performance characteristics of a particular index server subset 204 may change, e.g., due to the deployment and/or removal of computing resources, or fluctuation in the availability and/or cost of computing resources. For example, an estimate and/or measurement of a performance characteristic may be determined to vary from a previous estimate and/or measurement. Responsive to such changes, an index server subset 204 may be automatically redistributed or otherwise reconfigured, e.g., in order to satisfy a guarantee of a performance characteristic that has been offered to an application. As a first such example, a performance characteristic of a data set may further comprise an update latency of updates to the data set 102 that is unacceptably high for a particular application. The index server subset 204 may be automatically redistributed by reducing an index replica count of index replicas of the index server subset 204 (e.g., decommissioning a particular index replica) to reduce the update latency, and an index server 206 may be reconfigured to adapt to the removal (e.g., configuring the index server 206 to refrain from synchronizing the data set index 114 with the removed replica). As a second such example, a performance characteristic of a data set 102 may further comprise a concurrency of read accesses of the data set 102 and/or a resiliency of the data set 102 to faults, where such characteristics are unacceptably poor for a particular application. The index server subset 204 may be automatically redistributed by increasing an index replica count of index replicas of the index server subset to increase at least one of the concurrency and the resiliency of the data set, and an index server 206 may be reconfigured to adapt to the addition of the replica (e.g., configuring the index server 206 to initiate and periodically perform synchronization of the data set index 114 with the added replica).

As a third such example, a redistribution of the set 202 may be prompted by a change in the performance characteristics upon which the application depends. As a first such example, the addition of features may present new capabilities that alter the sensitivities and/or tolerances of the application; e.g., an application that utilized a comparatively static data set 102 in a read-only context for clients 122 may introduce a feature that enables clients 122 to contribute data, thus increasing the sensitivity of the data set 102 to update latency. This change may prompt the set of servers to automatically reduce or consolidate index server replicas, such that synchronization of updates to the data set index 114 may occur more quickly and therefore expedite the fulfillment of updates to the data set 102. Conversely, an application may introduce an application-level cache that reduces the sensitivity of the application to read latency. Accordingly, the number and/or geographical distribution of index servers 206 may be curtailed, e.g., to provide the data set 102 at a reduced but still acceptable read latency in exchange for a lower resource cost of hosting the data set 102 for the application.

These and other scenarios may be promoted by variations in the deployment of the index server subset 204. As a first such example, the performance characteristics may be evaluated, reevaluated, and/or monitored while providing the data set 102 for the application. While the application utilizes the data set indexed by the index server subset, an embodiment may capture a measurement of the performance characteristic for the index server subset 204, and perform a comparison of the measurement of the performance characteristic with a guarantee for the application. Based on the comparison, the embodiment may automatically adjust the index server subset 204. As a first such example, the comparison may indicate a deficiency between the guarantee and the measurement of the performance characteristic, and the adjustment may involve adding, to the index server subset 204, a new index replica that is collocated with at least one storage server 210 of the set 202 to raise the performance characteristic toward the guarantee. As a second such example, the comparison may indicate that the measurement of the performance characteristic exceeds the guarantee by a measurement margin (e.g., that the set 202 exhibits performance that exceeds the sensitivities of the application), where such excess performance is not beneficial to the application and/or more efficiently applied to the hosting of other data sets 102 for other applications. The adjustment of the index server subset 204 may include moving a selected index replica to a more distant location— e.g., substituting a distant index replica that is further from the storage server than the selected index replica. The substitution may reduce a resource cost of the application while maintaining the performance characteristic within the measurement margin of the guarantee.

In some circumstances, an option to redistribute the index server subset 204 may be automatically detected (e.g., by evaluating the possible distribution options for the index server subset 204, estimating or measuring the performance characteristics thereof, and identifying advantageous alternatives to a current distribution). In some instances, the option may be presented to an administrator of the data set 102 and/or an administrator of the application, along with a description of comparative advantages and/or costs with respect to a current distribution of the index server subset 204. Upon receiving acceptance of an option as an alternative to the current distribution, and/or upon identifying that an option is advantageous in the absence of acceptance by an administrator, an embodiment of the techniques may automatically initiate the redistribution of the index server subset (e.g., an automated provisioning, redeployment, and/or decommissioning of index servers 206 in various regions 212; an automated initiation of synchronization processes to propagate at least a portion of the data set index 114 to a new replica; and/or a reconfiguration of the existing index servers 206, such as a repartitioning of the data set index 114 over the index servers 206, an adjustment of synchronization schedules, and/or a reassignment of the records 112 stored by a particular storage server 210 that was indexed by a first index server 206, and is now to be indexed instead by a second index server 206).

Figure 10:
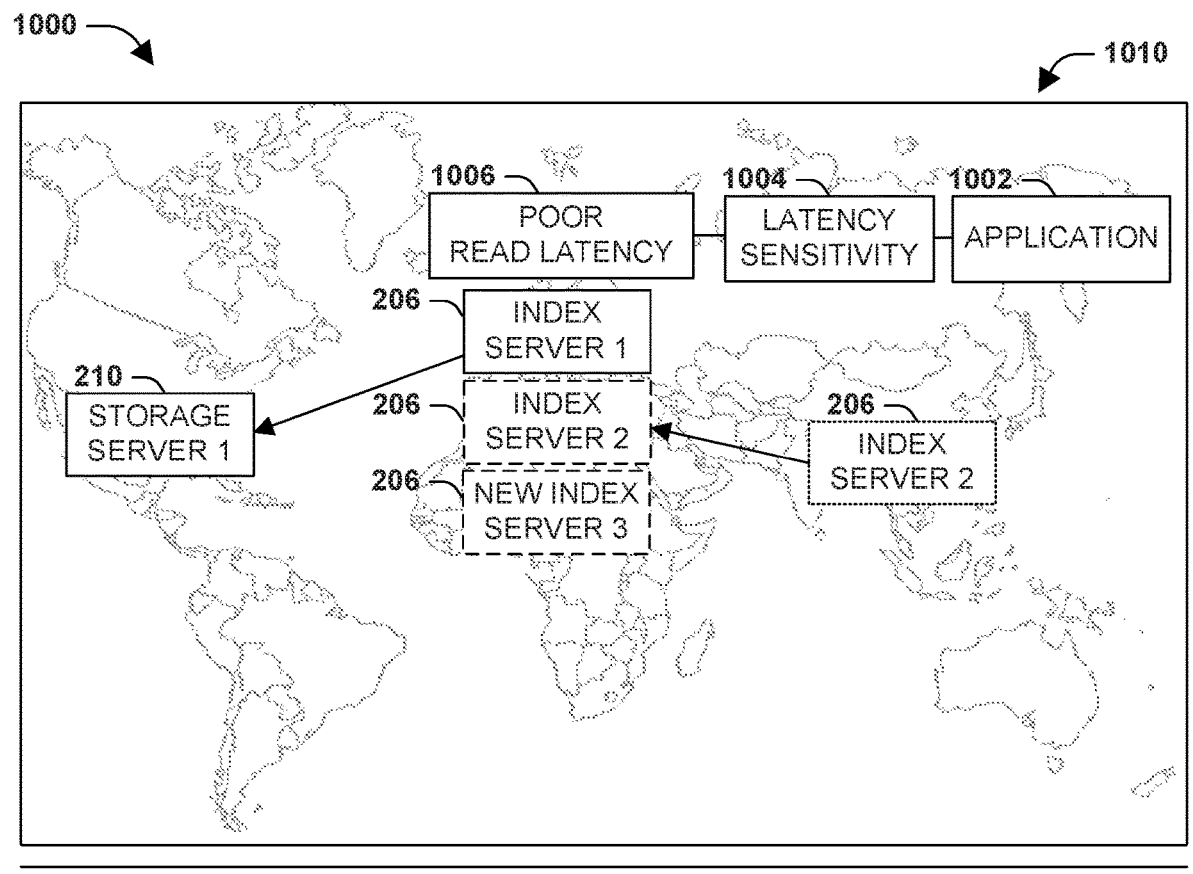
FIG. 10 is an illustration of an example scenario featuring a redistribution of an index server subset for a data set serving an application in accordance with the techniques presented herein.
Figure 10:
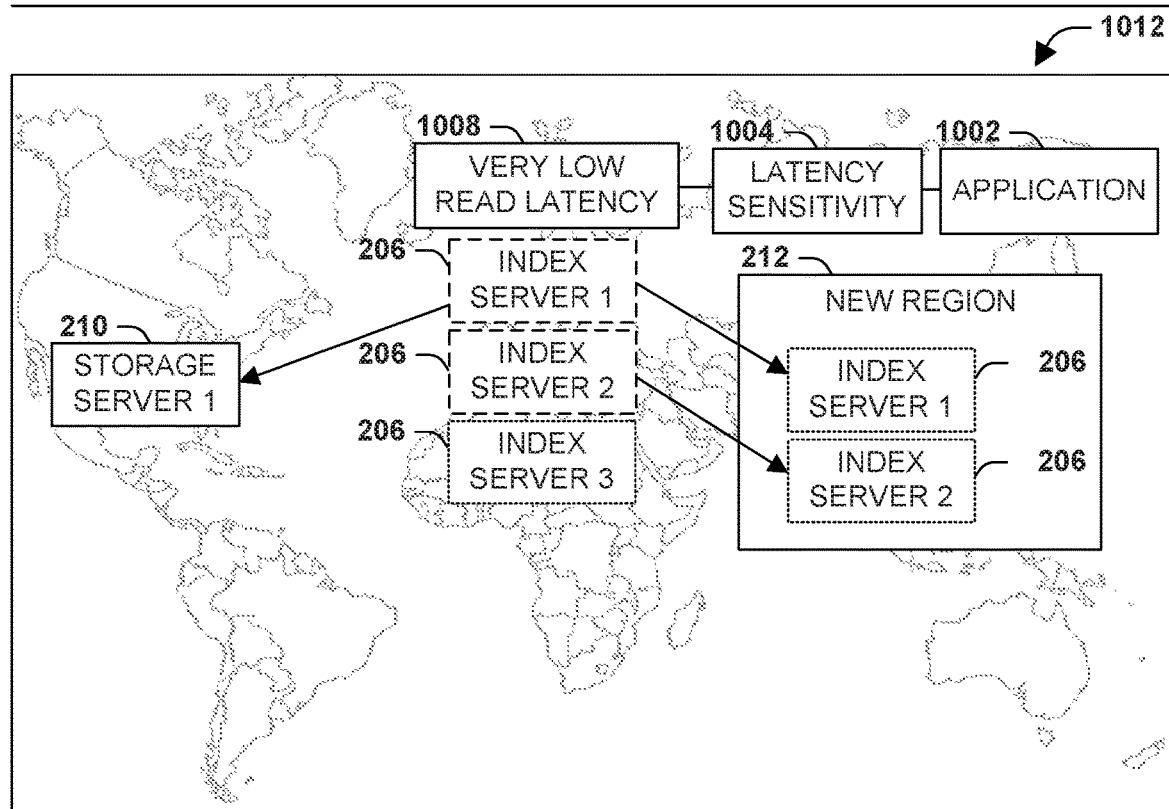

FIG. 10 is an illustration of a set 1000 of example scenarios in which a set 202 is automatically redistributed in response to changes in performance characteristics.

In a first example scenario 1010, the data set 102 may be provided for an application 1002 that has a particular read latency sensitivity 1004, e.g., a dependency upon rapid read performance, such that queries are to be satisfied typically within ten milliseconds. A pair of index server 206 may be initially be located in respective anticipated sources 904 of read demand for a storage server 210 that is remotely located in a third region 212. However, the read latency 1006 of the first index server 206 may be measured to be inadequate. Accordingly, the second index server 206 may be automatically relocated to a greater proximity (e.g., within the same region 212) with the first index server 206, and a third index server 206 may be automatically provisioned in the same region 212 as the first two index servers 206, such that indexing capacity is increased for the region 212 and read latency is reduced to meet a guarantee to satisfy the latency sensitivity 1004 of the application 1002.

In a second example scenario 1012, the data set 102 may be provided for an application 1002 that has a particular read latency sensitivity 1004, e.g., a dependency upon rapid read performance, such that queries are to be satisfied typically within ten milliseconds. However, a measurement 1008 of the read latency may indicate that the index servers 206 provided in the region 212 are overperforming, i.e., that an excessive number of index servers have been provided at an unduly high resource cost, where very low read latency is determined to provide insignificant value for the application 1002. An embodiment of the presented techniques may identify a new region 212 in which index servers 206 may be allocated that, while exhibiting a higher read latency due to the distance between the first region 212 and the new region 212, may be capable of satisfying the latency sensitivity 1004 of the application 1002 at a lower resource cost. An option to relocate the index servers 206 may be identified, and optionally presented to an administrator of the set 202 and/or the application 1002 as a recommended redistribution of the set 202 for the application 1002. The redistribution may be automatically implemented by an embodiment of the presented techniques; e.g., the first and second index servers 206 may be automatically relocated to the new region 212, while the third index server 206 may be decommissioned and/or redeployed to serve a different data set 102. In this manner, automated redistribution of the index server subset 204 may promote the satisfaction of latency sensitivities 1004 of applications in view of changing circumstances. Many such techniques may be utilized to automate the reevaluation and redistribution of the index server subset 204 based upon changing circumstances in accordance with the techniques presented herein.

E6. Index Server Variations

A sixth aspect that may among embodiments of the presented techniques involves additional variations in the placement of index servers 206 and storage servers 210 in accordance with the techniques presented herein.

As a first variation of this sixth aspect, a data set 102 may further comprise records 112 that are stored according to different set schemas, including by storage servers 210 that utilize different database systems. For instance, the data set 102 may comprise a first subset of records 112 that are stored by a first storage server 210 according to a first data set schema, and a second subset of records 112 that are stored by a second storage server 210 according to a second data set schema that is different than the first data set schema. An index server 206 may index both the first subset of records 112 and the second subset of records 112, independently and irrespective of discrepancies in the respective data set schemas utilized by the first storage server 210 and the second storage server 210.

Figure 11:
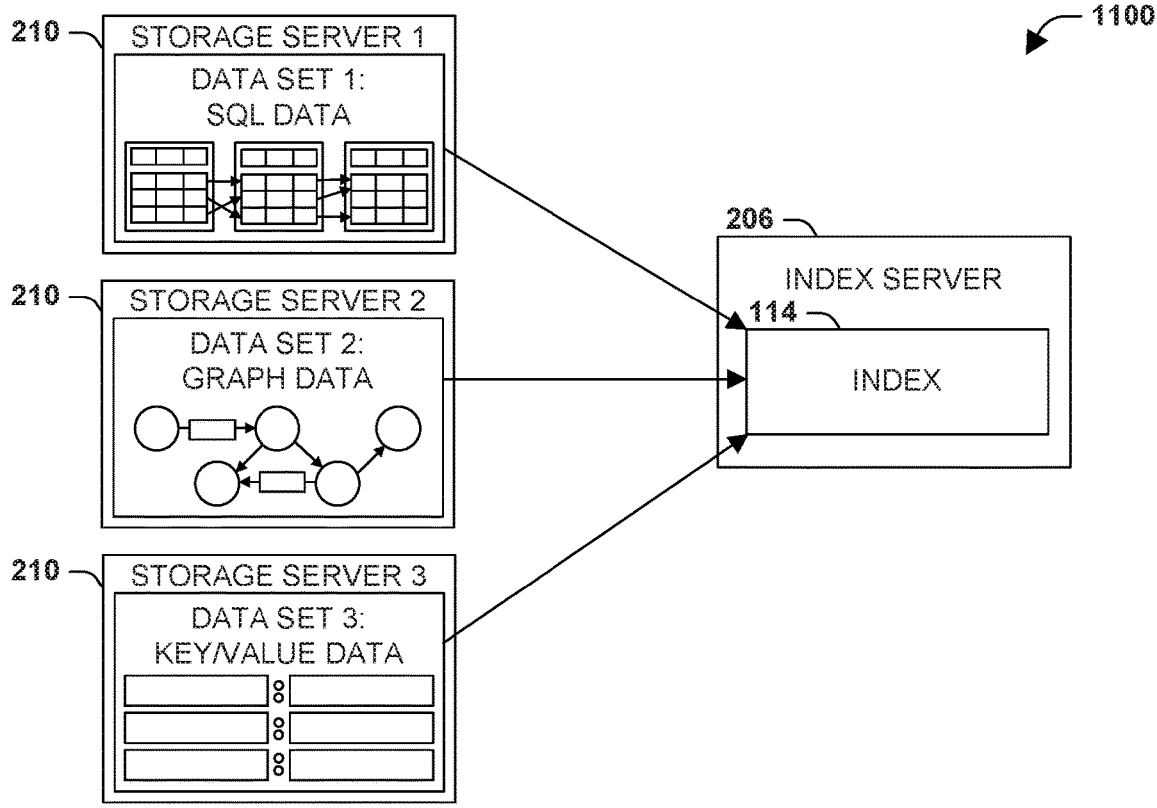
FIG. 11 is an illustration of an example scenario featuring an index server that indexes records stored by data servers in a variety of data set schemas in accordance with the techniques presented herein.

FIG. 11 is an illustration of an example scenario 1100 featuring one such variation of the techniques presented herein. In this example scenario 1100, the data set comprises a multitude of storage servers 210 that store a portion of the indexed data set 102 according to different data set schemas, such as a first storage server 210 storing records 112 as a SQL database comprising a set of interrelated tables; a second storage server 210 storing records 112 in a graph format, such as a set of nodes interrelated by edges comprising various properties; and a third storage server 210 storing records 112 as a key/value store. The index server 206 may store an index 114 that indexes the records 112 of all three storage servers 210, irrespective of the schema distinctions thereamong. One such technique for achieving this type of hybrid index 114 is the translation of the records 112 into a schema-agnostic format, such as an atom-record-sequence format, where the logical structure of the respective records 112 of the various storage servers 210 may be reduced to a common format that may be similarly indexed in the index 114 of the index server 206. Such techniques may be promoted by the decoupling of the index server 206 from the storage servers 210, where the selection of a data set schema utilized by a particular storage server 210 may not materially affect the manner in which the index server 206 indexes records 112 of the storage server 210, and may not require a change of format of the index 114 of the index server 206 to achieve such indexing. In this manner, the index server 206 may index the records of a hybrid data set 102 that spans multiple types of storage servers 210 that exhibit the data set schemas of a variety of database systems, which may be achieved in part by the decoupling of the storage servers 210 and the index servers 206 in accordance with the techniques presented herein.

As a second variation of this sixth aspect, an index server 206 may store a plurality of indices 114 of the data set 102 that are usable in different contexts. For example, an index server 206 may store an index set comprising a first index 114 in a first index format that fulfills queries of a first query type, and a second index 114 in a second index format that fulfills queries of a second query type that is different than the first query type. When the index server 206 receives a record 112 to be added to the data set 102, the index server 206 may add the record 112 to both the first index 114. and the second index 114. Thereafter, the index server 206 may evaluate a query over the data set 102 by choosing, from the index set, a selected index 114 that fulfills queries of a query type that matches the query, and using the selected index 114 to identify the storage server that stores the record 112.

Figure 12:
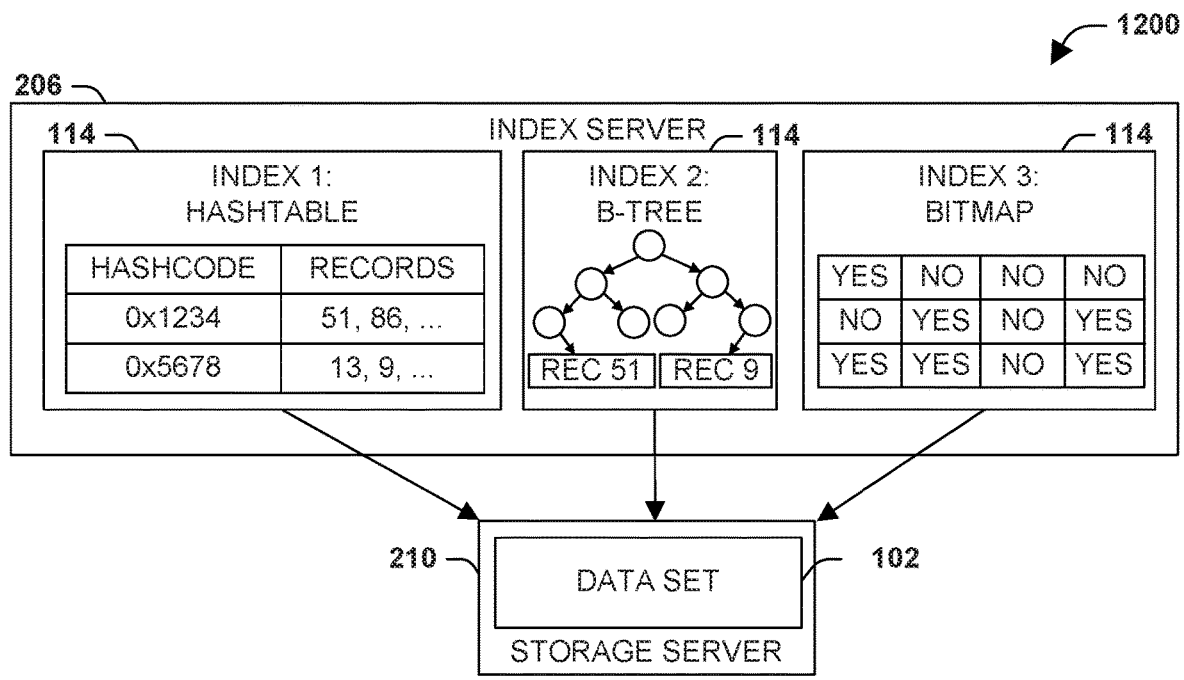
FIG. 12 is an illustration of an example scenario featuring an index server comprising a plurality of indices over a data set stored by a storage server that fulfill queries of different query types in accordance with the techniques presented herein.

FIG. 12 is an illustration of an example scenario 1200 featuring an index server 206 comprising a plurality of indices 114 in accordance with this variation. In this example scenario 1200, the index server 206 comprises three indices 114 that index the records 112 of the data set 102 in different ways. A first index 114 may comprise a hashtable, which may be used to fulfill queries in which all the records 112 storing a particular value of a particular attribute are to be identified (e.g.: "SELECT * FROM ORDERS WHERE DATE=#11/24/2017#"). A second index 114 may comprise a B-tree, which may be used to fulfill queries that comprise a sequence of characters (e.g.: "SELECT * FROM USERS WHERE NAME LIKE 'JON*'"), where the subtree of the index 114 that satisfies the specified letters indicates all of the records that match the provided sequence. A third index 114 may comprise a bitmap that enables the index server to answer a Boolean query, such as whether any records exist with a particular value (e.g.: "SELECT CASE WHEN EXISTS (SELECT * FROM ORDERS WHERE DATE='#11/24/2017#') THEN 'TRUE' ELSE 'FALSE' END"). The index server 206 may provide all such indices 114 over a portion of the data set 102 that is stored by one or more storage servers 210, and may fulfill queries by choosing the index 114 that provides the type of information involved in evaluating the logic of the query. The index server 206 may also update and maintain all of the indices 114 as the records 112 of the data set 102 stored by the storage server 210 are updated. In some variations, multiple index servers 206 may be provided that store different types of indices 114 that may be used to evaluate different queries, and queries may be routed to the index server 206 that stores an index 114 that fulfills queries of the query type that matches the query. In other variations, an index server 206 may generate, apply, and discard indices 114 of varying index types as the queries presented to the index server 206 change; e.g., if the index server 206 is receiving a large number of queries that involve sequences, the index server 206 may automatically generate an index 114 that indexes the records 112 of the data set 102 stored by one or more data servers 210 in a manner that is easily examined to determine sequences, such as a B-tree index. As yet another example, an index server 206 may choose and generate index types of indices 114 according to the types of records 112 that are stored by one or more of the storage servers 210 for the data set 102; e.g., if the index server 206 determines that a storage server 210 is storing a large number of records that are likely to be queried by sequence, such as text fields like names, the index server 206 may automatically generate a B-tree index 114 and populate it with the records 112 of the storage server 210. Such variations in the provision of multiple indices 114 of different types over the records 112 of the data set 102 of the storage server 210, and moreover of records 112 of different schemas stored by multiple storage servers 210, may be achieved partly through the decoupling of the index servers 206 from the storage servers 210 in accordance with the techniques presented herein.

F. Computing Environment

Figure 13:
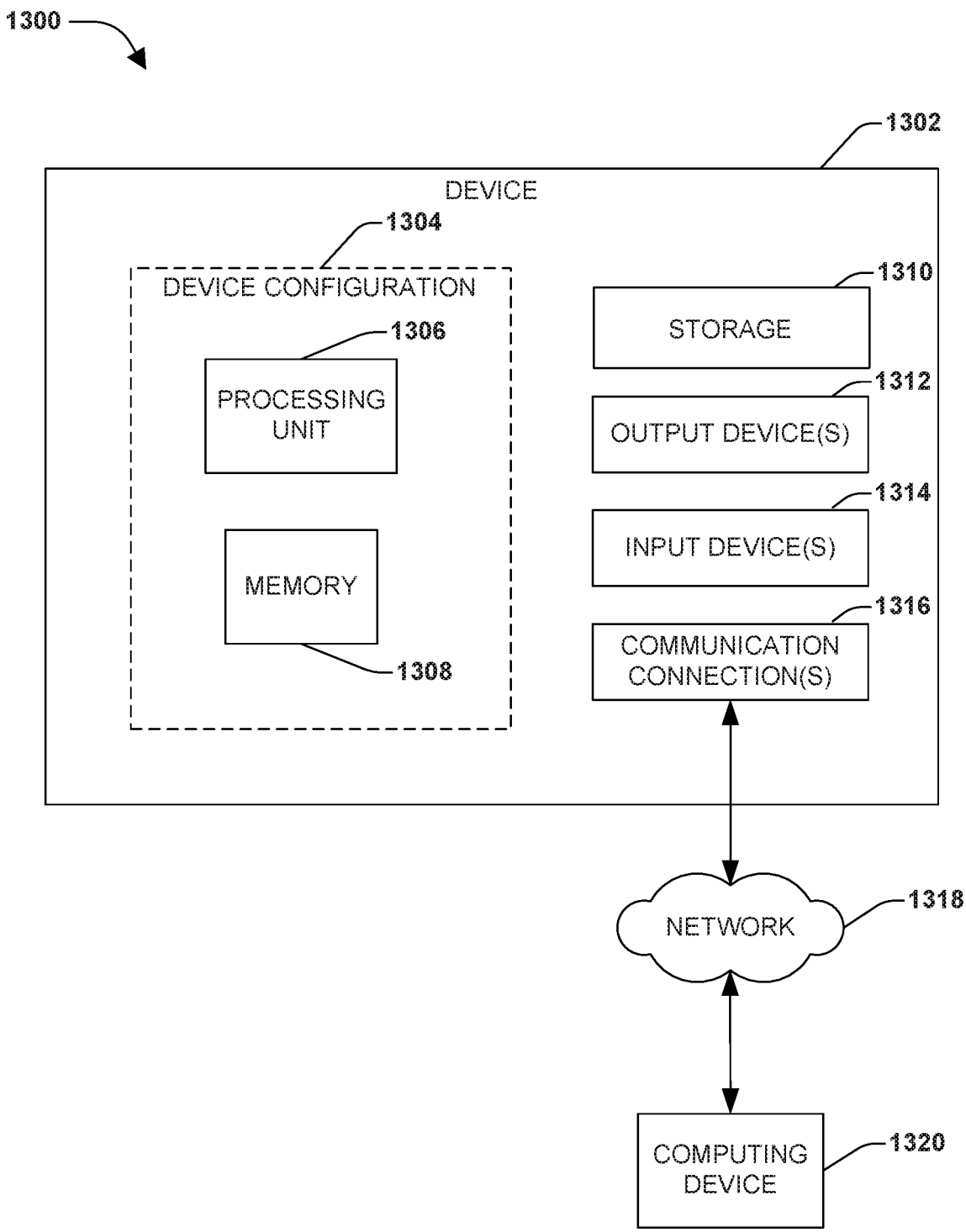
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 1300 comprising a computing device 1302 configured to implement one or more embodiments provided herein. In one configuration, computing device 1302 includes at least one processing unit 1306 and memory 1308. Depending on the exact configuration and type of computing device, memory 1308 may be volatile (such as RAM, for example), non-volatile (such as ROM, flash memory, etc., for example) or some combination of the two. This configuration is illustrated in FIG. 13 by dashed line 1304.

In other embodiments, device 1302 may include additional features and/or functionality. For example, device 1302 may also include additional storage (e.g., removable and/or non-removable) including, but not limited to, magnetic storage, optical storage, and the like. Such additional storage is illustrated in FIG. 13 by storage 1310. In one embodiment, computer readable instructions to implement one or more embodiments provided herein may be in storage 1310. Storage 1310 may also store other computer readable instructions to implement an operating system, an application program, and the like. Computer readable instructions may be loaded in memory 1308 for execution by processing unit 1306, for example.

The term "computer readable media" as used herein includes computer storage media. Computer storage media includes volatile and nonvolatile, removable and non-removable media implemented in any method or technology for storage of information such as computer readable instructions or other data. Memory 1308 and storage 1310 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1302. Any such computer storage media may be part of device 1302.

Device 1302 may also include communication connections 1316 that allows device 1302 to communicate with other devices. Communication connection(s) 1316 may include, but is not limited to, a modem, a Network Interface Card (NIC), an integrated network interface, a radio frequency transmitter/receiver, an infrared port, a USB connection, or other interfaces for connecting computing device 1302 to other computing devices. Communication connection(s) 1316 may include a wired connection or a wireless connection. Communication connection(s) 1316 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1302 may include input devices 1314 such as a keyboard, mouse, pen, voice input device, touch input device, infrared cameras, video input devices, and/or any other input device. Output devices 1312 such as one or more displays, speakers, printers, and/or any other output device may also be included in device 1302. Input devices 1314 and output devices 1312 may be connected to device 1302 via a wired connection, wireless connection, or any combination thereof. In one embodiment, an input device or an output device from another computing device may be used as input devices 1314 or output devices 1312 for computing device 1302.

Components of computing device 1302 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1302 may be interconnected by a network. For example, memory 1308 may be comprised of multiple physical memory units located in different physical locations interconnected by a network.

Those skilled in the art will realize that storage devices utilized to store computer readable instructions may be distributed across a network. For example, a computing device 1320 accessible via network 1318 may store computer readable instructions to implement one or more embodiments provided herein. Computing device 1302 may access computing device 1320 and download a part or all of the computer readable instructions for execution. Alternatively, computing device 1302 may download pieces of the computer readable instructions, as needed, or some instructions may be executed at computing device 1302 and some at computing device 1320.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

As used in this application, the term "each," in the context of a plurality of items, is used to describe one or more of the items in the plurality in an individual manner. The term "each" is not intended to mean "each and every." In some instances, the comments about "each" item may accurately describe all of the items in the plurality; in other instances, one or more items in the plurality may not be accurately described by such comments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of storing a data set on a set of servers, wherein the set of servers comprises at least one storage server that stores at least a portion of the data set, the method comprising:
   configuring an index server of the set to:
      store a data set index comprising:
         a first index in a first index format that fulfills queries of a first query type, and
         a second index in a second index format that fulfills queries of a second query type;
      receive a record to be stored by a storage server of the set;
      add the record to both the first index and the second index of the index server including an indication of the storage server that stores the record, wherein the data set further comprises:
         a first subset of records that are stored by a first storage server according to a first data set schema, and
         a second subset of records that are stored by a second storage server according to a second data set schema that is different than the first data set schema, the data set index employing a single indexing schema for the first and second subsets of records, the indexing schema decoupled from the first and second data set schemas; and
      evaluate a query over the data set that involves the record by:
         from the data set index, choosing a selected index that fulfills queries of a query type that matches the query;
         using the selected index, identifying the storage server that stores the record; and
         initiating a fulfillment of the query by the storage server.

2. The method of claim 1, wherein:
   the data set is organized by the storage server according to a data set layout; and
   the data set index is organized by the index server according to an index data layout that is independent of the data set layout.

3. A method of configuring a set of servers to provide access to a data set, wherein the set of servers comprises at least one storage server that stores at least a portion of the data set, the method comprising:
   selecting, from the set, a storage server of the data set, wherein the data set further comprises:
      a first subset of records that are stored by a first storage server according to a first data set schema,
      a second subset of records that are stored by a second storage server according to a second data set schema that is different than the first data set schema, and;
   selecting, from the set, an index server subset of index servers comprising a first index server and a second index server of the data set, wherein the index server subset excludes the storage server; and
   configuring the first index server to:
      receive a record to be stored by a storage server of the set;
      add the record to a data set index of the index server including an indication of a location of the record in the set the data set index employing a single indexing schema for the first and second subsets of records, the indexing schema decoupled from the first and second data set schemas;
      synchronize the data set index with the second index server; and
      route queries over the data set to the storage server of the set that stores records of the data set that are involved in the query.

4. The method of claim 3, wherein:
   the storage server is closer to the second index server than the first index server; and
   the first index server synchronizes the data set index with the second index server using a synchronization schedule that is proportional to a predicted demand of the record from the storage server.

5. The method of claim 3, wherein:
   the first index server is located in a first region; and
   the index server subset further comprises:
      a local index replica that is collocated with the first index server;
      a first regional index replica that is not collocated with the first index server, and that is located within the first region; and
      a second regional index replica that is located within a second region that is different than the first region.

6. The method of claim 5, wherein the first index server is configured to synchronize the data set index by:
   synchronizing the data set index with the local index replica according to a first synchronization schedule; and
   synchronizing the data set index with the first regional index replica according to a second synchronization schedule that is different than the first synchronization schedule.

7. The method of claim 3, wherein:
   the first index server is located in a fault domain of the set; and
   the index server subset further comprises at least one index replica that is located in a different fault domain than the fault domain of the first index server.

8. The method of claim 3, wherein selecting the index server subset further comprises:
   identifying a performance characteristic of an application utilizing the data set; and
   selecting the index server subset based on the performance characteristic.

9. The method of claim 8, wherein:
the performance characteristic further comprises an update latency of updates to the data set; and
selecting the index server subset further comprises: reducing an index replica count of index replicas of the index server subset to reduce the update latency.

10. The method of claim 8, wherein:
the performance characteristic further comprises at least one of:
  a concurrency of read accesses of the data set, and
  a resiliency of the data set to faults; and
selecting the index server subset further comprises:
  increasing an index replica count of index replicas of the index server subset to increase at least one of the concurrency and the resiliency of the data set.

11. The method claim 8, further comprising:
generating an estimate of the performance characteristic for the index server subset; and
offering to host the data set for the application with a guarantee of the estimate of the performance characteristic.

12. The method of claim 8, further comprising:
while the application utilizes the data set indexed by the index server subset, capturing a measurement of the performance characteristic for the index server subset;
performing a comparison of the measurement of the performance characteristic with a guarantee for the application; and
adjusting the index server subset based on the comparison.

13. The method of claim 12, wherein:
the comparison indicates a deficiency between the guarantee and the measurement of the performance characteristic; and
adjusting the index server subset further comprises: adding, to the index server subset, a new index replica that is collocated with at least one storage server of the set to raise the performance characteristic toward the guarantee.

14. The method of claim 12, wherein:
the comparison indicates that the measurement of the performance characteristic exceeds the guarantee by a measurement margin; and
adjusting the index server subset further comprises:
  for a selected index replica of the index server subset, substituting a distant index replica that is further from the storage server than the selected index replica, and wherein the substituting reduces a resource cost of the application while maintaining the performance characteristic within the measurement margin of the guarantee.

15. An index server that provides access to a data set accessible through a set of servers, wherein the set of servers comprises at least one storage server that stores at least a portion of the data set, the index server comprising:
a processor; and
a memory storing:
  a data set index, comprising:
    a first index in a first index format that fulfills queries of a first query type, and
    a second index in a second index format that fulfills queries of a second query type;
    a first subset of records that are stored by a first storage server according to a first data set schema, and
    a second subset of records that are stored by a second storage server according to a second data set schema that is different than the first data set schema, the data set index employing a single indexing schema for the first and second subsets of records, the indexing schema decoupled from the first and second data set schemas; and
  instructions that, when executed by the processor, cause the index server to:
    receive a record to be stored by a storage server of the data set;
    add the record to both the first index and the second index, the record including an indication of the storage server that stores the record; and
    evaluate a query over the data set that involves the record by:
      choosing, from the data set index, a selected index that fulfills queries of a query type that matches the query;
      using the selected index to identify the storage server that stores the record; and
      initiating a fulfillment of the query by the identified storage server.

16. The index server of claim 15, wherein at least a portion of the memory storing the data set index further comprises a solid-state storage device.

17. The index server of claim 15, wherein the index server:
initially receives updates to be applied to the data set; and
the index server adds the updates of the data set to the data set index.

18. The index server of claim 15, wherein initiating the fulfillment of the query further comprises at least one of:
forwarding the query to the identified storage server; and
informing a client that submitted the query of the identified storage server that stores the record.

* * * * *